(12) United States Patent
Yoo et al.

(10) Patent No.: US 12,488,893 B2
(45) Date of Patent: Dec. 2, 2025

(54) METHOD AND SYSTEM FOR TRAINING MACHINE LEARNING MODEL FOR DETECTING ABNORMAL REGION IN PATHOLOGICAL SLIDE IMAGE

(71) Applicant: LUNIT INC., Seoul (KR)

(72) Inventors: Donggeun Yoo, Seoul (KR); Jaehong Aum, Seoul (KR); Minuk Ma, Seoul (KR); Jeong Un Ryu, Seoul (KR)

(73) Assignee: LUNIT INC., Seoul (KR)

( * ) Notice: Subject to any disclaimer, the term of this patent is extended or adjusted under 35 U.S.C. 154(b) by 662 days.

(21) Appl. No.: 17/550,034

(22) Filed: Dec. 14, 2021

(65) Prior Publication Data

US 2022/0262513 A1    Aug. 18, 2022

(30) Foreign Application Priority Data

Feb. 18, 2021 (KR) .................. 10-2021-0022050
May 26, 2021 (KR) .................. 10-2021-0067783
Sep. 10, 2021 (KR) .................. 10-2021-0120991

(51) Int. Cl.
*G06T 7/00* (2017.01)
*G06N 20/00* (2019.01)
*G16H 30/20* (2018.01)
*G16H 50/20* (2018.01)

(52) U.S. Cl.
CPC ............ *G16H 50/20* (2018.01); *G06N 20/00* (2019.01); *G06T 7/0012* (2013.01); *G16H 30/20* (2018.01); *G06T 2207/20081* (2013.01)

(58) Field of Classification Search
None
See application file for complete search history.

(56) References Cited

U.S. PATENT DOCUMENTS

| | | | |
|---|---|---|---|
| 2011/0111435 A1 | 5/2011 | Dobson et al. | |
| 2018/0129911 A1* | 5/2018 | Madabhushi | G06V 10/774 |
| 2020/0311931 A1* | 10/2020 | Yeh | G06V 10/764 |
| 2020/0364864 A1* | 11/2020 | Shanbhag | G06T 11/008 |
| 2020/0372635 A1* | 11/2020 | Veidman | G06T 7/0012 |
| 2023/0377155 A1* | 11/2023 | Raharja | G06T 7/0012 |
| 2024/0312604 A1* | 9/2024 | Che | G16H 30/40 |

FOREIGN PATENT DOCUMENTS

| | | |
|---|---|---|
| JP | 2020-502534 A | 1/2020 |
| WO | 2020/261183 A1 | 12/2020 |

* cited by examiner

*Primary Examiner* — John Villecco
*Assistant Examiner* — Han Hoang
(74) *Attorney, Agent, or Firm* — Sughrue Mion, PLLC

(57) ABSTRACT

A method, performed by at least one processor, for training a machine learning model for detecting an abnormal region in a pathological slide image is disclosed. The method including receiving one or more first pathological slide images, determining, from the received one or more first pathological slide images, a normal region based on an abnormality condition indicative of a condition of an abnormal region, generating a first set of training data including the determined normal region, generating the abnormal region by performing image processing corresponding to the abnormality condition with respect to at least partial region in the received one or more first pathological slide images, and generating a second set of training data including the generated abnormal region.

18 Claims, 19 Drawing Sheets

METHOD AND SYSTEM FOR TRAINING MACHINE LEARNING MODEL FOR DETECTING ABNORMAL REGION IN PATHOLOGICAL SLIDE IMAGE

CROSS-REFERENCE TO RELATED APPLICATION

This application claims priority under 35 U.S.C § 119 to Korean Patent Application No. 10-2021-0022050 filed in the Korean Intellectual Property Office on Feb. 18, 2021, Korean Patent Application No. 10-2021-0067783 filed in the Korean Intellectual Property Office on May 26, 2021, and Korean Patent Application No. 10-2021-0120991 filed in the Korean Intellectual Property Office on Sep. 10, 2021, the entire contents of which are hereby incorporated by reference.

TECHNICAL FIELD

The present disclosure relates to a method and a system for training a machine learning model for detecting an abnormal region in a pathological slide image, and specifically, to a method and a system for generating training data to train a machine learning model for detecting an abnormal region.

BACKGROUND

Techniques for obtaining histological information or predicting prognosis of a patient using pathological slide images of the patient have been developed. For example, analysis algorithms for extracting or predicting various information about the patient from the pathological slide images have been developed. However, when an error occurs on the pathological slide image, the performance of the analysis algorithm, etc. may be degraded, and thus, information about the patient may be incorrectly extracted or predicted. Therefore, it is necessary to filter out the regions corresponding to the error on the pathological slide image in advance and generate an analysis algorithm using only the normal regions. Furthermore, an algorithm for detecting a region of interest included in the pathological slide image is required.

On the other hand, it is not easy for a person to directly determine whether an error has occurred on the pathological slide image. Specifically, it is difficult for the person to directly label the region corresponding to the error since there are only a very few errors that may occur on the pathological slide image. Therefore, a machine learning model for detecting errors on pathological slide images is required.

SUMMARY

In order to solve the problems described above, the present disclosure provides a method, a computer program stored in a recording medium, and an apparatus (system) for training a machine learning model for detecting an abnormal region in a pathological slide image.

In addition, in order to solve the problems described above, the present disclosure provides a method, a computer program stored in a recording medium, and an apparatus (system) for detecting an abnormal region in a pathological slide image.

The present disclosure may be implemented in various ways, including a method, a system (apparatus), or a computer program stored in a computer-readable storage medium, and a computer-readable storage medium in which the computer program is stored.

According to an embodiment, a method, performed by at least one processor, for training a machine learning model for detecting an abnormal region in a pathological slide image is provided. The method may include receiving one or more first pathological slide images, determining, from the received one or more first pathological slide images, a normal region based on an abnormality condition indicative of a condition of an abnormal region, generating a first set of training data including the determined normal region, generating the abnormal region by performing image processing corresponding to the abnormality condition with respect to at least partial region in the received one or more first pathological slide images, and generating a second set of training data including the generated abnormal region.

According to an embodiment, the method may further include training a machine learning model for detecting the abnormal region in the one or more first pathological slide images by using the generated first set of training data and the generated second set of training data.

According to an embodiment, the machine learning model may be further trained to output an abnormality score indicative of a degree of abnormality for one or more regions in a pathological slide image. The method may include receiving one or more second pathological slide images, inputting a plurality of regions included in the received one or more second pathological slide images to the trained machine learning model, to output abnormality scores for the plurality of regions, extracting at least a portion of the plurality of regions based on the output anomaly scores, and including the extracted at least portion of the plurality of regions in the second set of training data.

According to an embodiment, the abnormality condition may include a plurality of abnormality conditions. The generating the abnormal region may include randomly selecting one or more conditions from the plurality of abnormality conditions, and generating the abnormal region by performing image processing corresponding to one or more randomly selected conditions with respect to the at least partial region in the received one or more first pathological slide images.

According to an embodiment, the generating of the first set of training data may include in response to a user input, receiving a label indicative of a normal region, and generating a first set of training data including the received label and the normal region.

According to an embodiment, the generating the abnormal region may include generating the abnormal region by applying a blur kernel to the at least partial region in the one or more first pathological slide images.

According to an embodiment, the generating the abnormal region may include generating the abnormal region by applying a color transformation function to the at least partial region in the one or more first pathological slide images.

According to an embodiment, the generating the abnormal region may include generating the abnormal region by applying at least one of a specific color or a specific brightness to the at least partial region in the one or more first pathological slide images.

According to an embodiment, the generating the abnormal region may include generating the abnormal region by inserting a geometric figure into the at least partial region in the one or more first pathological slide images.

According to an embodiment, the generating the abnormal region may include dividing the at least partial region of the one or more first pathological slide images into a first sub-region and a second sub-region, and generating the abnormal region by overlaying a portion of the first sub-region on a portion of the second sub-region.

According to an embodiment, the generating the abnormal region may include dividing the at least partial region of the one or more first pathological slide images into a plurality of sub-regions, generating an image including a region having a change in at least one of a position, shape, size, or angle of each of the plurality of divided sub-regions, and generating the abnormal region by combining the generated images.

According to another embodiment, a method, performed by at least one processor, for detecting an abnormal region in a pathological slide image is provided. The method may include receiving one or more pathological slide images, and detecting, in the received one or more pathological slide images, an abnormal region meeting an abnormality condition by using a machine learning model. The machine learning model may be trained to detect an abnormal region in a reference pathological slide image by using a plurality of normal regions extracted from the reference pathological slide image and a plurality of abnormal regions generated by performing the image processing corresponding to the abnormality condition with respect to at least partial region in the reference pathological slide image.

According to an embodiment, the machine learning model may include a classifier configured to determine whether the at least partial region in the one or more pathological slide images correspond to a normal region or an abnormal region.

According to an embodiment, the machine learning model may include a segmentation model configured to output whether a plurality of pixels included in the at least partial region of the one or more pathological slide images are the normal region or the abnormal region.

A computer program is provided, which is stored on a computer-readable recording medium for executing, on a computer, the method described above according to the embodiment.

An information processing system according to another embodiment of the present disclosure is provided, which may include a memory storing one or more instructions, and a processor configured to execute the stored one or more instructions to receive one or more first pathological slide images, determine, from the received one or more first pathological slide images, a normal region based on an abnormality condition indicative of a condition of the abnormal region, generate a first set of training data including the determined normal region, generate the abnormal region by performing image processing corresponding to the abnormality condition with respect to the at least partial region in the received one or more first pathological slide images, and generate a second set of training data including the generated abnormal region.

An information processing system according to another embodiment of the present disclosure is provided, which may include a memory storing one or more instructions, and a processor configured to execute the stored one or more instructions to receive one or more pathological slide images, detect, in the received one or more pathological slide images, an abnormal region meeting an abnormality condition by using a machine learning model. The machine learning model may be trained to detect an abnormal region in a reference pathological slide image by using a plurality of normal regions extracted from the reference pathological slide image and a plurality of abnormal regions generated by performing the image processing corresponding to the abnormality condition with respect to at least partial region in the reference pathological slide image.

According to some embodiments of the present disclosure, the user may simply identify an abnormal region in a pathological slide image through the information processing system without having to check the pathological slide image and directly determining whether or not the image includes error information.

According to some embodiments of the present disclosure, even when the training data is not sufficient to train a machine learning model, the user can directly generate the training data by using the abnormality condition, etc., such that the machine learning model can be effectively trained.

According to some embodiments of the present disclosure, by iteratively and additionally training the machine learning model using data having a small difference between the inferred information and the actual information, the performance of the machine learning model can be continuously improved.

According to some embodiments of the present disclosure, an ROI excluding unnecessary regions such as a background region, a region having a marker drawing, a reference tissue region, etc. in the pathological slide image can be extracted as a target to be analyzed, so that an amount of computation required to analyze the pathological slide image and/or the time it takes can be reduced.

According to some embodiments of the present disclosure, the extracted ROI can be used as a target to be analyzed, so that the accuracy of a prediction result according to the analysis can be further improved.

According to some embodiments of the present disclosure, since the regions for the reference tissues included in the pathological slide image (e.g., IHC-stained image) can be excluded, errors that may occur in the analysis and/or prediction of the patient associated with the pathological slide image can be eliminated or minimized.

The effects of the present disclosure are not limited to the effects described above, and other effects not mentioned will be able to be clearly understood by those of ordinary skill in the art (referred to as "those skilled in the art") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawing, in which.

DETAILED DESCRIPTION

Figure 1:
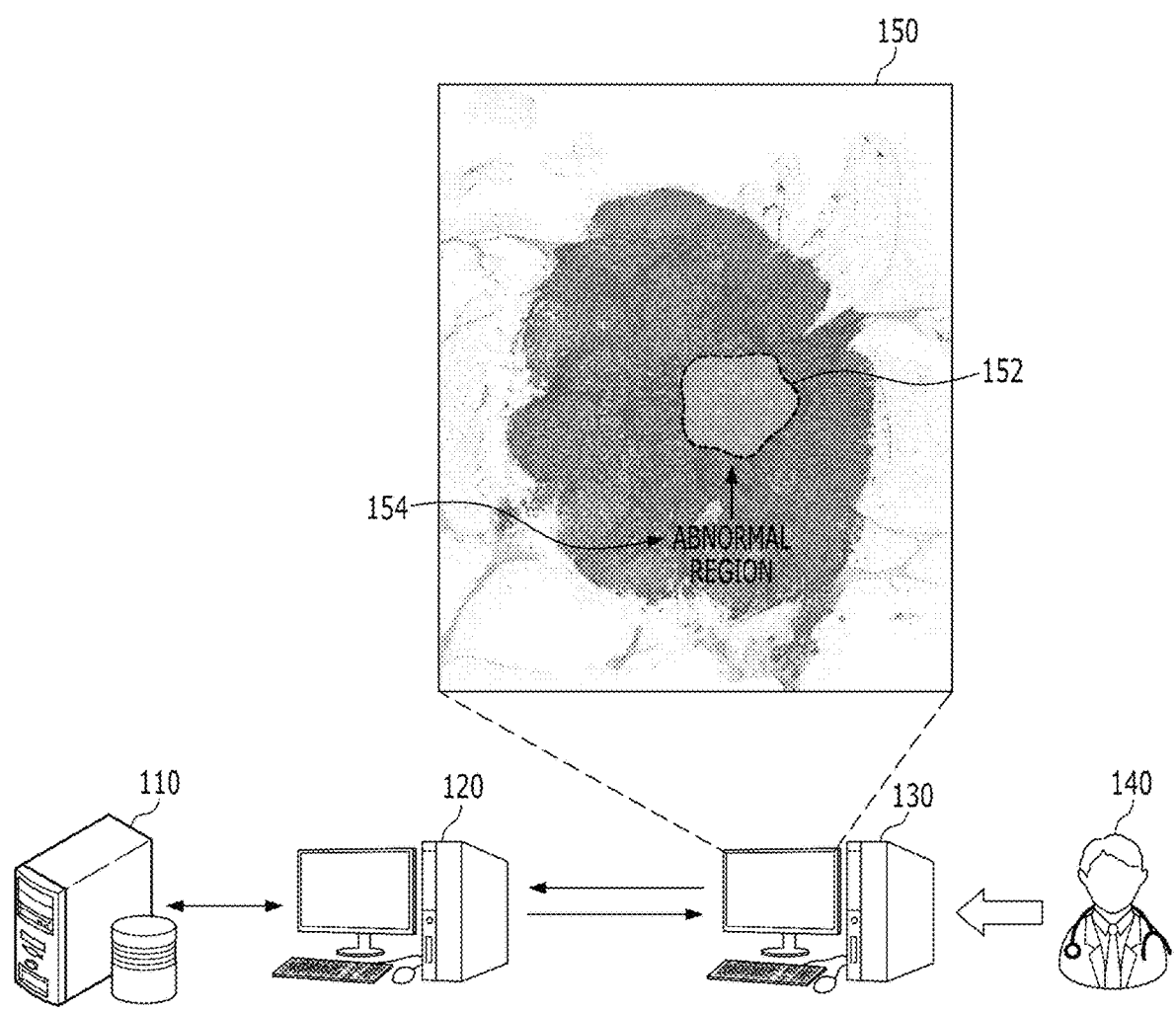
FIG. 1 is an exemplary configuration diagram illustrating an information processing system for providing information on an abnormal region in a pathological slide image to an embodiment.

Hereinafter, specific details for the practice of the present disclosure will be described in detail with reference to the accompanying drawings. However, in the following description, detailed descriptions of well-known functions or configurations will be omitted when it may make the subject matter of the present disclosure rather unclear.

In the accompanying drawings, the same or corresponding elements are assigned the same reference numerals. In addition, in the following description of the embodiments, duplicate descriptions of the same or corresponding components may be omitted. However, even if descriptions of components are omitted, it is not intended that such components are not included in any embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the present embodiments are merely provided to make the present disclosure complete, and to fully disclose the scope of the invention to those skilled in the art to which the present disclosure pertains.

The terms used herein will be briefly described prior to describing the disclosed embodiments in detail. The terms used herein have been selected as general terms which are widely used at present in consideration of the functions of the present disclosure, and this may be altered according to the intent of an operator skilled in the art, conventional practice, or introduction of new technology. In addition, in a specific case, the term may be arbitrarily selected by the applicant, and the meaning of the term will be described in detail in a corresponding description of the embodiments. Therefore, the terms used in the present disclosure should be defined based on the meaning of the terms and the overall content of the present disclosure rather than a simple name of each of the terms.

As used herein, the singular forms 'a,' 'an,' and 'the' are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it intends to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to reproduce one or more processors. Accordingly, as an example, the "module" or "unit" may include components such as software components, object-oriented software components, class components, and task components, and at least one of processes, functions, attributes, procedures, subroutines, program code segments of program code, drivers, firmware, micro-codes, circuits, data, database, data structures, tables, arrays, and variables. Furthermore, functions provided in the components and the "modules" or "units" may be combined into a smaller number of components and "modules" or "units," or further divided into additional components and "modules" or "units."

According to an embodiment, the "module" or "unit" may be implemented as a processor and a memory. The "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The "processor" may refer to a combination of processing devices, e.g., a combination of a DSP and a microprocessor, a plurality of microprocessors, one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and so on. The memory is said to be in electronic communication with a processor if the processor can read information from and/or write information to the memory. The memory integrated with the processor is in electronic communication with the processor.

In the present disclosure, the "system" may refer to at least one of a server device and a cloud device, but not limited thereto. For example, the system may include one or more server devices. In another example, the system may include one or more cloud devices. In another example, the system may be configured together with both a server device and a cloud device and operated.

In the present disclosure, a "display" may refer to any display device associated with a computing device and/or an information processing system, and for example, it may refer to any display device that is controlled by the computing device, or that can display any information/data provided from the computing device.

In the present disclosure, an "artificial neural network model" is an example of a machine learning model, and may include any model used to infer an answer to a given input. According to an embodiment, the artificial neural network model may include an artificial neural network model including an input layer, a plurality of hidden layers, and an output layer. In an example, each layer may include one or more nodes. In addition, the artificial neural network model may include weights associated with a plurality of nodes included in the artificial neural network model. In an example, the weights may include any parameter that is associated with the artificial neural network model.

In the present disclosure, the "pathology slide image" may refer to an image obtained by capturing a pathological slide fixed and stained through a series of chemical treatments in order to observe a tissue removed from a human body with a microscope. In an example, the pathology slide image may refer to a whole slide image including a high-resolution image of the whole slide. Alternatively, the pathological slide image may refer to a portion of the whole slide image of such high resolution. For example, the pathological slide image may refer to a patch region that has been divided into patches from the whole slide image. Such a patch may have a size of a certain area. Alternatively, such a patch may refer to a region including each of the objects included in the whole slide. In addition, the pathological slide image may refer to a digital image captured with a microscope, and may include information on cells, tissues, and/or structures in the human body.

In the present disclosure, an "abnormal region" may refer to, among the regions included in the pathological slide image, a region that includes error information that is inappropriate for determining a lesion of a patient. Also, the normal region may be a remaining region excluding the abnormal region among THE regions included in the pathological slide image. For example, the abnormal region may include a region with low resolution due to defocus, a region with incorrect staining, a region containing foreign substances, a region without tissue, a region with folded tissue, a region with a deformed or rotated position, etc., but not limited thereto. In addition, the abnormal region may refer to, among the regions included in the pathological slide image, a region that is not associated with a tissue of the patient. For example, the abnormal region may include, but is not limited to, a background region in a pathological slide image, a reference tissue, a region marked with a marker, etc.

In the present disclosure, an "abnormality condition" may refer to a condition that is a criterion for determining whether a specific region included in the pathological slide image includes the abnormal region including error information. In addition, the abnormality condition may refer to a condition that is a criterion for determining whether a specific region included in the pathological slide image is a region not associated with the tissue of the patient. The abnormality condition may include a plurality of abnormality conditions, and a region of the pathological slide image meeting at least one of the plurality of abnormality conditions may be determined to be the abnormal region.

In the present disclosure, a "geometric figure" may refer to any point, line (curved line), plane, solid, and/or a set of these.

In the present disclosure, "each of a plurality of A" may refer to each of all components included in the plurality of A, or may refer to each of some of the components included in a plurality of A. For example, each of a plurality of sub-regions may refer to each of all sub-regions included in the plurality of sub-regions, or may refer to some of the plurality of sub-regions.

In the present disclosure, "instructions" may refer to one or more instructions grouped based on functions, which are the components of a computer program and executed by the processor.

FIG. 1 is an exemplary configuration diagram illustrating an information processing system 120 for providing information on an abnormal region in a pathological slide image 150 according to an embodiment. As illustrated, the information processing system 120 may be configured so as to be communicatively connected to each of a user terminal 130 and a storage system 110. While FIG. 1 illustrates one user terminal 130, the present disclosure is not limited thereto, and in an exemplary configuration, a plurality of user terminals 130 may be connected to the information processing system 120 for communication. In addition, while the information processing system 120 is illustrated as one computing device in FIG. 1, the present disclosure is not limited thereto, and the information processing system 120 may be configured to process information and/or data in a distributed manner through a plurality of computing devices. In addition, while the storage system 110 is illustrated as a single device in FIG. 1, the present disclosure is not limited thereto, and the system may be configured with a plurality of storage devices or as a system that supports a cloud. In addition, respective components of the system for providing information on an abnormal region 152 in the pathological slide image 150 illustrated in FIG. 1 represent functional components that can be divided on the basis of functions, and in an actual physical environment, a plurality of components may be implemented as being incorporated with each other.

The storage system 110 is a device or a cloud system that stores and manages various types of data associated with a machine learning model for providing information on the abnormal region 152 included in the pathological slide image 150, etc. For efficient data management, the storage system 110 may store and manage various types of data using a database. In an example, the various types of data may include any data associated with the machine learning model (e.g., weights, parameters, input and output values, etc. associated with the machine learning model). Furthermore, the data may include information on the detected abnormal region 152, etc., but is not limited thereto. While FIG. 1 shows the information processing system 120 and the storage system 110 as separate systems, the present disclosure is not limited thereto, and they may be incorporated into one system.

The information processing system 120 and/or the user terminal 130 is any computing device that is used to provide information on the abnormal region 152 including error information included in the pathological slide image 150. In an example, the computing device may refer to any type of device equipped with a computing function, and may be a notebook, a desktop, a laptop, a tablet computer, a server, a cloud system, etc., for example, but is not limited thereto. The information processing system 120 may provide the pathological slide image 150 to the user terminal 130 such that the provided pathological slide image 150 may be displayed on a display device of the user terminal 130. According to an embodiment, the information processing system 120 may provide a user 140 with the pathological slide image 150 through the user terminal 130, in which the pathological slide image 150 may include texts, guidelines, indicators, etc., which indicate whether or not the abnormal region 152 is included in the pathological slide image, which are indicative of position, size, shape, etc. of the abnormal region 152, etc.

According to an embodiment, the information processing system 120 may receive one or more pathological slide images 150. Additionally or alternatively, the information processing system 120 may receive an image that includes the pathological slide image 150. In addition, the information processing system 120 may detect the abnormal region 152 meeting the abnormality condition in the received pathological slide image 150. In an example, the abnormality condition may refer to any condition that is a criterion for determining whether a specific region included in the pathological slide image includes the abnormal region including error information. In addition, the abnormal region 152 may refer to, among the regions included in the pathological slide image 150, a region that includes error information that is inappropriate for determining a lesion of the patient, etc., and a region with an insufficient quality to perform at least one of analysis, determination, training, and inference by using a machine learning model. For example, there may be abnormal region, etc. that includes types of problem listed in Table 1.

The information processing system 120 may detect the abnormal region 152 in the pathological slide image 150 and display the detected abnormal region 152 and text 154 indicative of the abnormal region 152 together with the pathological slide image 150 on the display. With such a configuration, the user 140 may check the pathological slide image 150 and simply check the abnormal region 152 in the pathological slide image 150 through the information processing system 120, without having to directly determine whether or not the corresponding image contains error information meeting the abnormality condition.

According to an embodiment, the information processing system 120 may detect the abnormal region 152 by using the machine learning model trained to detect the abnormal region 152 in the pathological slide image 150. That is, the information processing system 120 may input the pathological slide image 150 and/or an image including the pathological slide image 150 to the trained machine learning model to detect the abnormal region 152. For example, the machine learning model may include a classifier that determines whether each region corresponds to a normal region or an abnormal region for each region in the pathological slide image 150. In another example, the machine learning model may include a segmentation model that performs labeling on pixels included in the abnormal region in the pathological slide image 150.

According to an embodiment, the information processing system 120 may generate training data for training the machine learning model. For example, the information pro-

TABLE 1

| Type | Name | Description |
|---|---|---|
| image quality problem during scanning | out of focus | when image is not clear due to out of focus |
| image quality problem | resolution problem (out-of-range MPP value) | when image has too low resolution because the micrometer per pixel (MPP) value is out of appropriate range |
| image quality problem | resolution problem (low magnification) | when image has too low resolution due to low magnification |
| slide quality problem | foreign substance marking | when foreign substances such as dust, written characters, etc. are marked on the slide |
| slide quality problem | stain quality problem | when stain is lighter or darker than predetermined value for H&E staining, when the two reagents are out of balance for IHC (immunohistochemistry) staining, when it is dirty due to nonspecific staining |
| slide quality problem | specimen cut problem | knife marks folded tissue tissue tear thick section |
| slide quality problem | problem of tissue/block itself | poor fixation squeezing artifact |
| slide quality problem | when method of tissue fixation is different (e.g., FFPE vs Frozen) | when method of tissue fixation is different from the predetermined method |
| analysis target error | problem with different stain type | when slide is stained with different type of stain |
| analysis target error | problem of deviating from target cancer type | when it is not the target arm type |
| analysis target error | when the tissue collection location is incorrect | when the tissue collection location is not the target location |
| analysis target error | when target to be analyzed is not in the slide | when target to be analyzed is not in the slide | cessing system 120 may receive one or more pathological slide images, and determine a normal region from the received one or more pathological slide images based on the abnormality condition indicative of a condition of the abnormal region. In this case, the information processing system 120 may generate a first set of training data including the determined normal region.

In addition, the information processing system 120 may generate the abnormal region by performing image processing corresponding to the abnormality condition with respect to at least partial region in the one or more pathological slide images (e.g., any region, a normal region, etc. of the pathological slide image). Then, the information processing system 120 may generate a second set of training data including the generated abnormal region. For example, the information processing system 120 may generate the first set of training data by determining a normal region such that the normal region has a resolution equal to or greater than a corresponding resolution condition based on an abnormality condition indicative of a predetermined resolution condition. In addition, the information processing system 120 may generate a second set of training data by determining an abnormal region such that the abnormal region has a resolution equal to or less than the corresponding resolution condition. Additionally or alternatively, the training data may be manually generated by the user 140 directly. For example, the information processing system 120 may receive user inputs from operations performed in association with labeling of normal and/or abnormal regions, and generate the first set of training data and/or the second set of training data.

Then, the information processing system 120 may train the machine learning model for detecting an abnormal region in one or more pathological slide images based on the generated first and second sets of training data. For example, the machine learning model may include a Convolutional Neural Network (CNN), but is not limited thereto. With such a configuration, even when the training data for training the machine learning model is insufficient, the user 140 can effectively train the machine learning model by directly generating the training data by using the abnormality condition, etc.

FIG. 1 illustrates that the text 154 indicative of the abnormal region 152 is displayed together with a guideline (arrow) at the bottom of the abnormal region 152 in the pathological slide image 150, but embodiments are not limited thereto, and the text 154 may be displayed in any region in the pathological slide image 150 and/or in a region outside the pathological slide image 150 including information indicative of the configuration of the pathological slide image 150. In addition, FIG. 1 illustrates that a dotted lined box indicative of the abnormal region 152 is displayed on the pathological slide image 150, but this is an example, and the abnormal region 152 may be indicated with various types of geometric shapes, or the dotted lined box indicative of the abnormal region 152 may be not displayed and omitted.

According to another embodiment, the information processing system 120 may receive one or more pathological slide images and detect an ROI in the received pathological slide images. In order to detect such an ROI, the information processing system 120 may use at least one of an image processing technique, a machine learning model technique, a conditional or rule-based analysis technique, as will be described below. The ROI detected as described above may be displayed through a display device connected to the user terminal 130 by wire or wirelessly.

Figure 2:
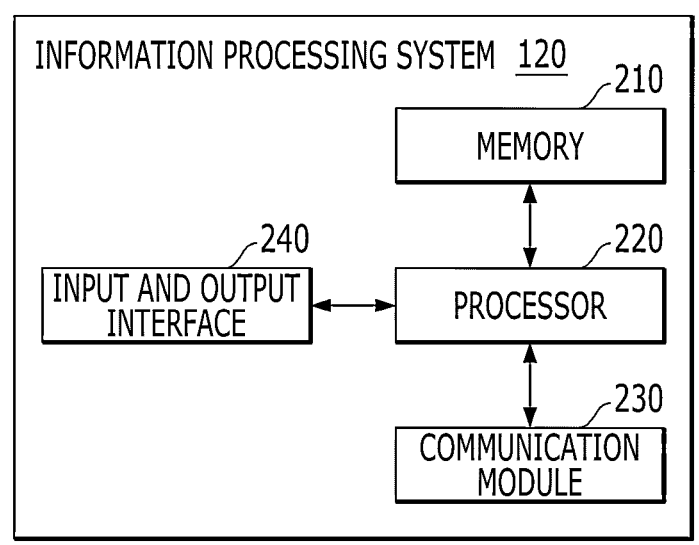
FIG. 2 is a block diagram illustrating an internal configuration of the information processing system according to an embodiment.

FIG. 2 is a block diagram illustrating an internal configuration of the information processing system 120 according to an embodiment. The information processing system 120 may include a memory 210, a processor 220, a communication module 230, and an input and output interface 240. As illustrated in FIG. 2, the information processing system 120 may be configured to communicate information and/or data through a network by using the communication module 230.

The memory 210 may include any non-transitory computer-readable recording medium. According to an embodiment, the memory 210 may include a permanent mass storage device such as random access memory (RAM), read only memory (ROM), disk drive, solid state drive (SSD), flash memory, and so on. In another example, a non-destructive mass storage device such as ROM, SSD, flash memory, disk drive, and so on may be included in the information processing system 120 as a separate permanent storage device that is distinct from the memory. In addition, the memory 210 may store an operating system and at least one program code (e.g., a code installed and driven in the information processing system 120, to detect an abnormal region or an ROI in the pathological slide image, generate training data of a machine learning model for detecting the abnormal region or the ROI, etc.).

These software components may be loaded from a computer-readable recording medium separate from the memory 210. Such a separate computer-readable recording medium may include a recording medium directly connectable to the information processing system 120, and may include a computer-readable recording medium such as a floppy drive, a disk, a tape, a DVD/CD-ROM drive, a memory card, etc., for example. In another example, the software components may be loaded into the memory 210 through the communication module 230 rather than the computer-readable recording medium. For example, at least one program may be loaded into the memory 210 based on a computer program (e.g., a program for detecting an abnormal region or an ROI in a pathological slide image, determining whether or not each region in the pathological slide image corresponds to a normal region/abnormal region, or an ROI, labeling pixels included in the abnormal region or the ROI, generating training data for a machine learning model to detect the abnormal region or the ROI, etc.) installed by files provided by developers or by a file distribution system for distributing installation files of applications through the communication module 230.

The processor 220 may be configured to process the commands of the computer program by performing basic arithmetic, logic, and input and output operations. The commands may be provided to a user terminal (not illustrated) or another external system by the memory 210 or the communication module 230. For example, the processor 220 may receive one or more pathological slide images, and determine, from the received one or more pathological slide images, a normal region based on an abnormality condition indicative of the condition of an abnormal region, and generate a first set of training data including the determined normal region. In addition, the processor 220 may generate the abnormal region by performing image processing corresponding to the abnormality condition with respect to the at least partial region in the received one or more pathological slide images, and generate a second set of training data including the generated abnormal region. Then, the processor 220 may train the machine learning model for detecting an abnormal region in one or more pathological slide images by using the generated first set of training data and the generated second set of training data.

In addition, the processor 220 may receive one or more pathological slide images, and detect an abnormal region meeting the abnormality condition in the received one or more pathological slide images by using the machine learning model. In an example, the machine learning model may be trained to detect the abnormal region in a received reference pathological slide image by using a plurality of normal regions extracted from a reference pathological slide image and a plurality of abnormal regions generated by performing the image processing corresponding to the abnormality condition with respect to at least partial region in the reference pathological slide image. The processor 220 may output or display information on the detected abnormal regions in a predetermined form (e.g., text, image, guideline, indicator, etc.) on the pathological slide image, a medical image, etc.

In another embodiment, the processor 220 may receive one or more pathological slide images and detect the ROI in the received one or more pathological slide images. In this case, the processor 220 may use a predetermined image processing technique to analyze the one or more pathological slide images, thereby detecting the ROI. Additionally or alternatively, the processor 220 may use the machine learning model to detect the ROI in one or more pathological slide images. In this case, the machine learning model may be trained to detect the ROI in a plurality of reference pathological slide images by using training data that includes a plurality of reference pathological slide images and information on a plurality of reference labels.

The communication module 230 may provide a configuration or function for the user terminal (not illustrated) and the information processing system 120 to communicate with each other through a network, and may provide a configuration or function for the information processing system 120 to communicate with an external system (e.g., a separate cloud system). For example, control signals, commands, data, etc. provided under the control of the processor 220 of the information processing system 120 may be transmitted to the user terminal and/or the external system through the communication module 230 and the network through the communication module of the user terminal and/or an external system. For example, the user terminal and/or the external system may receive information on the detected abnormal region and/or the ROI, etc. from the information processing system 120.

In addition, the input and output interface 240 of the information processing system 120 may be a means for interfacing with an inputting or outputting device (not illustrated) that may be connected to the information processing system 120 or included in the information processing system 120. In FIG. 2, the input and output interface 240 is illustrated as a component configured separately from the processor 220, but embodiments are not limited thereto, and the input and output interface 240 may be configured to be included in the processor 220. The information processing system 120 may include more components than those illustrated in FIG. 2. Meanwhile, most of the related components may not necessarily require exact illustration.

The processor 220 of the information processing system 120 may be configured to manage, process, and/or store the information and/or data received from a plurality of user terminals and/or a plurality of external systems. According to an embodiment, the processor 220 may receive one or more pathological slide images from the user terminal and/or the external system. In this case, the processor 220 may detect the abnormal region including error information in the received one or more pathological slide images. Alternatively, the processor 220 may detect the ROI in the received one or more pathological slide images.

Figure 3:
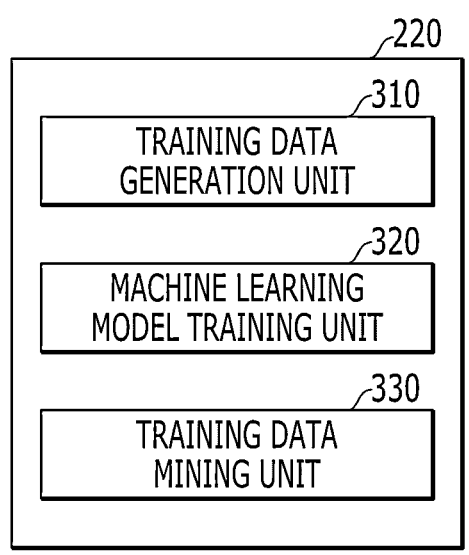
FIG. 3 is a functional block diagram illustrating an internal configuration of a processor according to an embodiment.

FIG. 3 is a functional block diagram illustrating an internal configuration of the processor 220 according to an embodiment. As illustrated, the processor 220 may include a training data generation unit 310, a machine learning model training unit 320, a training data mining unit 330, etc. According to an embodiment, the processor 220 may communicate with the storage device (e.g., the memory 210, etc.) and/or the external device (e.g., the user terminal or external system, etc.) including the pathological slide images (or at least a portion of the pathological slide image, an image containing the pathological slide image, etc.), and receive one or more pathological slide images.

According to an embodiment, the processor 220 may receive one or more pathological slide images, and detect the abnormal region meeting the abnormality condition in the received one or more pathological slide images. In this case, the processor 220 may detect the abnormal region using the machine learning model trained to detect an abnormal region in one or more pathological slide images. In another embodiment, the processor 220 may receive one or more pathological slide images and detect the ROI in the received one or more pathological slide images. For example, a predetermined image processing technique or a trained machine learning model may be used to detect the ROI.

According to an embodiment, the training data generation unit 310 may automatically generate training data to train a machine learning model. For example, the training data generation unit 310 may receive one or more pathological slide images. Then, the training data generation unit 310 may determine a normal region based on the abnormality condition indicative of the condition of the abnormal region from the one or more pathological slide images, and generate a first set of training data including the determined normal region. In addition, the training data generation unit 310 may generate the abnormal region by performing image processing corresponding to the abnormality condition with respect to the at least partial region in the received one or more pathological slide images, and generate a second set of training data including the generated abnormal region.

According to an embodiment, the training data generation unit 310 may determine whether or not the corresponding pathological slide image is normal based on the abnormality condition. For example, when it is determined that the pathological slide image is normal, the training data generation unit 310 may include the pathological slide image in the first set of training data. Additionally or alternatively, when it is determined that the received pathological slide image includes the abnormal region based on the abnormality condition, the training data generation unit 310 may include the pathological slide image in the second set of training data.

Regarding the image processing type, the training data generation unit 310 may generate the abnormal region by randomly selecting one or more conditions from among a plurality of abnormality conditions and performing image processing corresponding to the randomly selected one or more conditions with respect to the at least partial region in the received one or more pathological slide images. Additionally or alternatively, the abnormality condition may be selected by the user.

The training data generation unit 310 may generate the abnormal region by applying a blur kernel to the at least partial region of the one or more pathological slide images. In an example, the blur kernel may refer to a kernel for blurring or transforming the at least partial region of the image. When this blur kernel is applied, the resolution of the at least partial region of the pathological slide image may decrease below a predetermined resolution by the abnormality condition. That is, the training data generation unit 310 may generate the abnormal region of a predetermined resolution or less with the blur kernel and generate the second set of training data including the abnormal region.

Additionally or alternatively, the training data generation unit 310 may generate the abnormal region by applying a color transformation function to the at least partial region of the one or more pathological slide images. In an example, the color transformation function may refer to a function, algorithm, etc. for changing or transforming a color of the at least partial region of the image. For example, the training data generation unit 310 may adjust a hue associated with the color to change or transform the color of the at least partial region of the image to a different color from a color predetermined by the abnormality condition. In another example, the training data generation unit 310 may multiply an RGB vector by any matrix by using the color transformation function and then perform projection to change or transform the color of the at least partial region of the image to a different color from the color predetermined by the abnormality condition. That is, the training data generation unit 310 may generate the abnormal region having a different color from the predetermined color by using the color transformation function, and generate the second set of training data including the abnormal region.

Additionally or alternatively, the training data generation unit 310 may generate the abnormal region by applying at least one of a specific color or a specific brightness to the at least partial region of the one or more pathological slide images. For example, the training data generation unit 310 may apply a white color tone to the at least partial region of the pathological slide image based on the abnormality condition. Through this application, an effect can be achieved, in which it appears as if the target to be analyzed, such as tissue, etc., is removed from the pathological slide image.

Additionally or alternatively, the training data generation unit 310 may generate an abnormal region by inserting a geometric figure (e.g., an image including a geometric figure, etc.) into the at least partial region of the one or more pathological slide images. In this example, the geometric figure may refer to any point, line (curved line), plane, solid, and/or a set of these. For example, the training data generation unit 310 may generate the abnormal region with foreign substances inserted therein, by overlaying a specific image including the geometric figure on the pathological slide image using any transparency. In this case, the training data generation unit 310 may generate the second set of training data including the generated abnormal region.

Additionally or alternatively, the training data generation unit 310 may divide the at least partial region of the one or more pathological slide images into a first sub-region and a second sub-region. Then, the training data generation unit 310 may generate the abnormal region by overlay a portion of the first sub-region on a portion of the second sub-region. For example, the training data generation unit 310 may divide the at least partial region of the pathological slide image into two regions and then overlay them on each other with any transparency to generate the abnormal region such as a folded tissue. In this case, the training data generation unit 310 may generate the second set of training data including the generated abnormal region.

Additionally or alternatively, the at least partial region of the one or more pathological slide images may be divided into a plurality of sub-regions. Then, the training data generation unit 310 may generate the abnormal region by generating an image including a region having a change in at least one of the position, shape, size, or angle of each of the plurality of sub-regions, and combining the generated images. For example, the training data generation unit 310 may divide the at least partial region of the pathological slide image into a plurality of sub-regions, change each of the divided plurality of sub-regions by rotating them, moving them, and so on, and then place them back together to generate the abnormal region where it appears that tilting effect is generated. In this case, the training data generation unit 310 may generate the second set of training data including the generated abnormal region.

Additionally or alternatively, the first set of training data and/or the second set of training data may be manually generated by the user. In other words, the processor 220 may generate the first set of training data including the normal region or the second set of training data including the determined abnormal region based on user inputs. For example, the user may generate a pathological slide image including the abnormal region by selecting or changing a color of the abnormal region meeting the abnormality condition on the pathological slide image. In an embodiment, training data may be constructed with the pathological slide images including annotations on at least one of the abnormal region and the normal region. The method for generating the training data automatically and the method for generating the training data manually, which are described above, may be respectively performed or may be performed in combination.

According to an embodiment, the machine learning model training unit 320 may train the machine learning model for detecting an abnormal region in one or more pathological slide images based on the generated first and second sets of training data. For example, for each region in the one or more pathological slide images, the machine learning model may be trained as a classifier to determine whether each region corresponds to the normal region or the abnormal region, or as a segmentation model to perform labeling on the pixels included in the abnormal region. As described above, an initial machine learning model for detecting an abnormal region may be generated based on the first and second sets of training data. According to another embodiment, the machine learning model training unit 320 may train the machine learning model to detect the ROI in a plurality of reference pathological slide images by using training data including the plurality of reference pathological slide images and information on a plurality of reference labels.

Then, the initial machine learning model trained as described above may be additionally trained using inference data, etc. According to an embodiment, the machine learning model may be further trained to output an abnormality score indicative of the degree of abnormality for the one or more regions in the pathological slide image. In this case, the training data mining unit 330 may input one or more pathological slide images for inference to the machine learning model, and output abnormality scores for a plurality of regions (e.g., a plurality of patches) included in the one or more pathological slide images. For example, the abnormality score may be a score that can indicate the difference between the abnormal region inferred by the machine learning model and the abnormal region included in the actual pathological slide image, and may be calculated higher as the difference between the inferred information and the actual information is smaller. As described above, the abnormality score may be calculated by the machine learning model, but embodiments are not limited thereto, and the training data mining unit 330 may also calculate the abnormality score based on user inputs and/or any algorithm, etc.

The training data mining unit 330 may extract at least a portion of the plurality of regions based on the output abnormality score, and include the at least portion of the plurality of extracted regions in the second set of training data. For example, the training data mining unit 330 may extract the top n (n is a natural number) pathological slide images having high abnormality scores. In another example, the training data mining unit 330 may also extract the pathological slide images having the abnormality scores equal to or greater than a predetermined score. Then, the training data mining unit 330 may further train the machine learning model based on the second set of training data. That is, by iteratively and additionally training the machine learning model using the data having a small difference between the inferred information and the actual information, the performance of the machine learning model can be continuously improved.

Additionally or alternatively, the machine learning model may also be further trained to output a normality score indicative of a degree of normality for the one or more regions in the pathological slide image. In this case, the training data mining unit 330 may input the one or more pathological slide images for inference to the machine learning model, and output the normality scores for a plurality of regions (e.g., a plurality of patches) included in the one or more pathological slide images. For example, the normality score is a score that can indicate the difference between the normal region inferred by the machine learning model and the normal region included in the actual pathological slide image, and may be calculated higher as the difference between the inferred information and the actual information is smaller. In this case, the training data mining unit 330 may calculate the normality score based on user inputs and/or any algorithm, etc. In this case, the training data mining unit 330 may extract at least a portion of the plurality of regions based on the output normality score, include the at least portion of the plurality of extracted regions in the first set of training data, and further train the machine learning model based on the first set of training data.

Although the components of the processor 220 have been described separately for each function in FIG. 3, it does not necessarily mean that they are physically separated. For example, the training data generation unit 310 and the training data mining unit 330 have been described above as separate components, but this is for better understanding of the disclosure, and embodiments are not limited thereto. With such a configuration, even when the training data is insufficient, the processor 220 may directly generate or mine the training data to effectively train the machine learning model.

Figure 4:
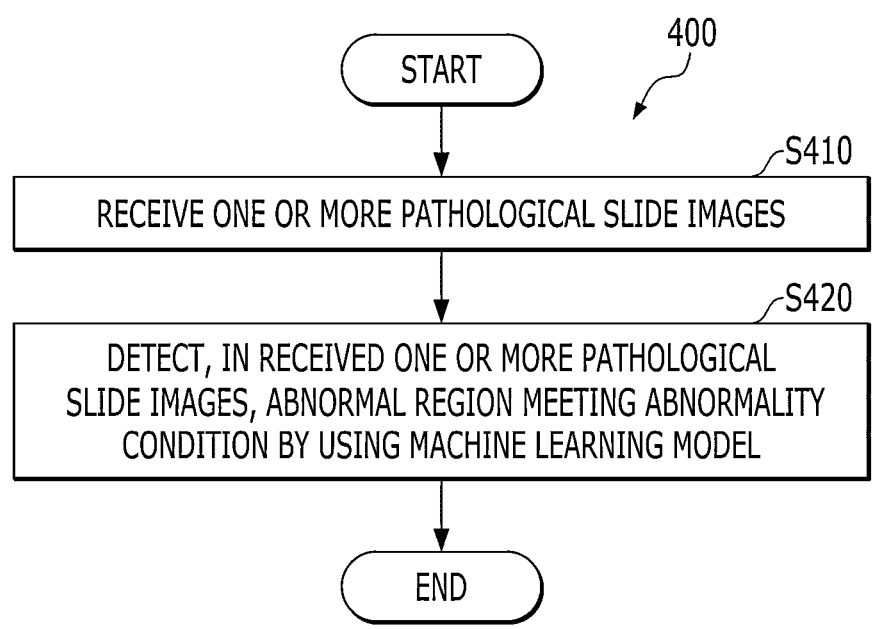
FIG. 4 is a flowchart illustrating a method for detecting an abnormal region in a pathological slide image according to an embodiment.

FIG. 4 is a flowchart illustrating a method 400 for detecting an abnormal region in a pathological slide image according to an embodiment. According to an embodiment, the method 400 for detecting an abnormal region may be performed by a processor (e.g., at least one processor of the information processing system and/or at least one processor of the user terminal). As illustrated, the method 400 for detecting an abnormal region may be initiated by the processor receiving one or more pathological slide images, at S410. In an example, the pathological slide image may include a whole pathological slide and/or a partial region in the pathological slide image, such as a patch.

When receiving the pathological slide image, the processor may use the machine learning model to detect the abnormal region meeting the abnormality condition in the received one or more pathological slide images, at S420. In an example, the machine learning model may be trained to detect an abnormal region in a reference pathological slide image by using a plurality of normal regions extracted from the reference pathological slide image and a plurality of abnormal regions generated by performing the image processing corresponding to the abnormality condition with respect to at least partial region in the reference pathological slide image. For example, the machine learning model may include a classifier that determines whether each region corresponds to a normal region or an abnormal region for each region in one or more pathological slide images. In another example, the machine learning model may include a segmentation model that performs labeling on pixels included in the abnormal region in one or more pathological slide images.

Figure 5:
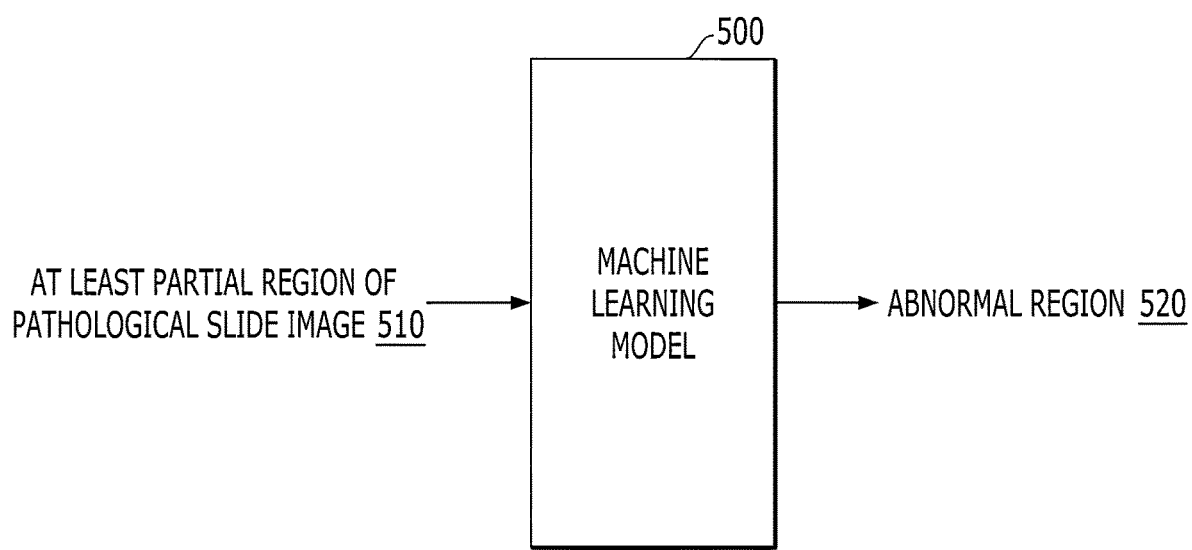
FIG. 5 illustrates an example of a machine learning model according to an embodiment.

FIG. 5 illustrates an example of a machine learning model 500 according to an embodiment. As illustrated, the machine learning model 500 may receive at least partial region 510 of the pathological slide image, and detect an abnormal region 520 including error information in the at least partial region 510 of the received pathological slide image. For example, the abnormal region 520 may be a region including error information that may be inappropriate for extracting information on the lesion of a patient, etc., or that may reduce the performance of any analysis algorithm that uses the at least partial region 510 of the pathological slide image. In an example, the pathological slide image may include a whole pathological slide and/or a partial region in the pathological slide image, such as a patch.

According to an embodiment, for each region in the at least partial region 510 of the pathological slide image, the machine learning model 500 may detect the abnormal region 520 by determining whether each region corresponds to the normal region or the abnormal region 520. Additionally or alternatively, the machine learning model 500 may detect the abnormal region 520 by performing labeling on the pixels included in the abnormal region 520 in the at least partial region 510 of the pathological slide image.

According to an embodiment, the machine learning model 500 may extract the abnormal region having a resolution equal to or less than a predetermined reference, such as being out of focus from the pathological slide image. Additionally or alternatively, the machine learning model 500 may extract, from the pathological slide image, a region stained with a color different from the intended staining color, or extract the abnormal region that does not include the target to be analyzed. Additionally or alternatively, the machine learning model 500 may extract a region including foreign substances, extract a region having a folded tissue, or extract an abnormal region having a tilting effect.

Figure 6:
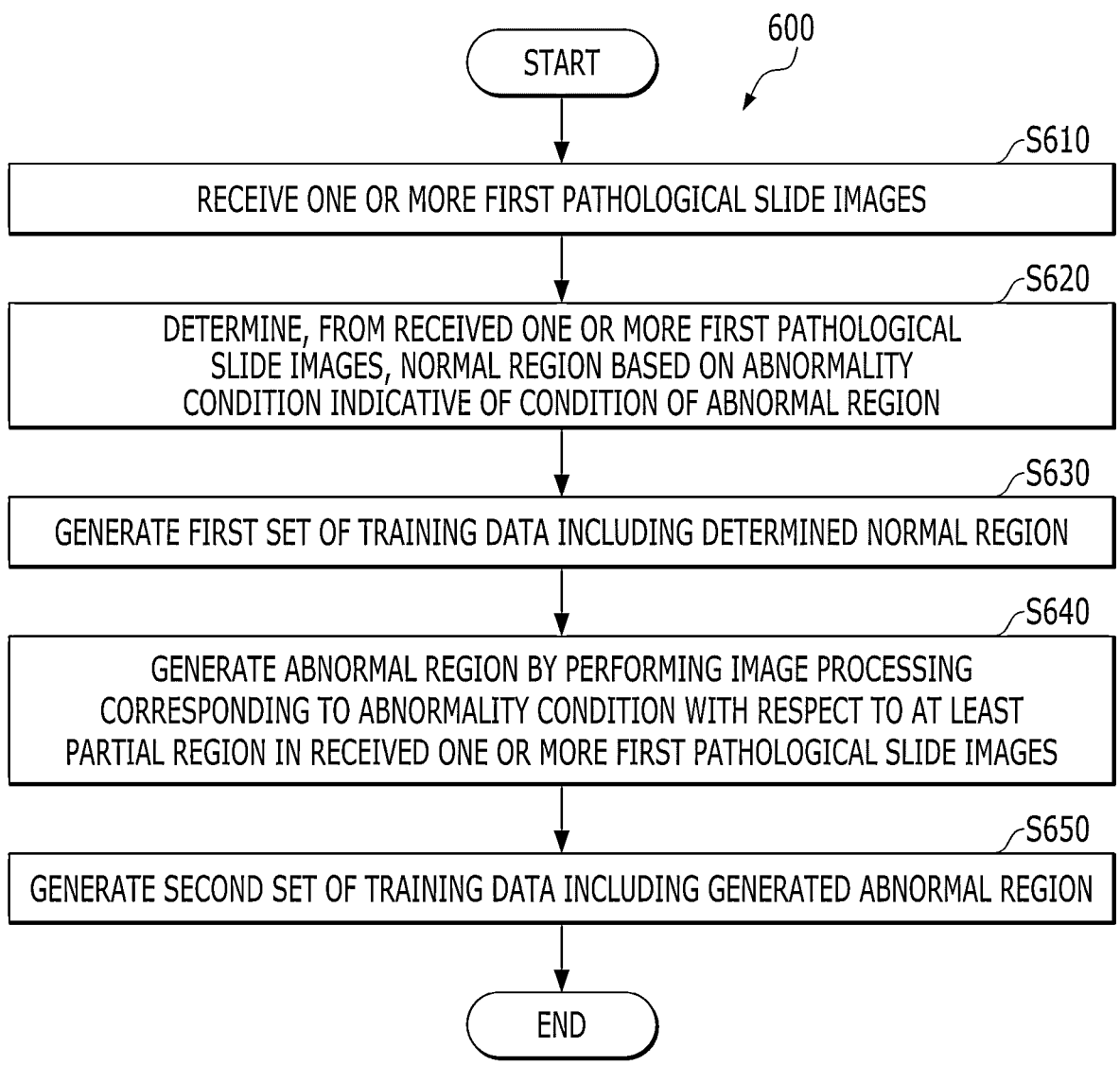
FIG. 6 is a flowchart illustrating a method for generating training data for detecting an abnormal region in a pathological slide image according to an embodiment.

FIG. 6 is a flowchart illustrating a method 600 for training a machine learning model for detecting an abnormal region in a pathological slide image according to an embodiment. According to an embodiment, the method 600 for training a machine learning model for detecting an abnormal region may be performed by a processor (e.g., at least one processor of the information processing system and/or at least one processor of the user terminal). As illustrated, the method 600 for training a machine learning model for detecting an abnormal region may be initiated by the processor receiving one or more first pathological slide images, at S610.

The processor may determine a normal region from the received one or more first pathological slide images, based on an abnormality condition indicative of the condition of an abnormal region, at S620. In addition, the processor may generate a first set of training data including the determined normal region, at S630. For example, in response to a user input, the processor may receive a label indicative of the normal region and generate the first set of training data including the received label and the normal region.

The processor may generate the abnormal region by performing image processing corresponding to the abnormality condition with respect to at least partial region in the received one or more first pathological slide images, at S640. In addition, the processor may generate a second set of training data including the generated abnormal region, at S650. In an example, the abnormality condition may include a plurality of abnormality conditions. In this case, the processor may generate the abnormal region by randomly selecting one or more conditions from among a plurality of abnormality conditions, and performing image processing corresponding to the one or more randomly selected conditions with respect to the at least partial region in the received one or more first pathological slide images. Then, the processor may train the machine learning model for detecting an abnormal region in one or more pathological slide images based on the generated first and second sets of training data.

According to an embodiment, the processor may generate the abnormal region by applying a blur kernel to the at least partial region in the one or more first pathological slide images. Additionally or alternatively, the processor may generate the abnormal region by applying a color transformation function to the at least partial region in the one or more first pathological slide images. Additionally or alternatively, the processor may generate the abnormal region by applying at least one of a specific color or a specific brightness to the at least partial region in the one or more first pathological slide images. Additionally or alternatively, the processor may generate the abnormal region by inserting a geometric figure into the at least partial region in the one or more first pathological slide images. Additionally or alternatively, the processor may generate the abnormal region by dividing the at least partial region of the one or more first pathological slide images into a first sub-region and a second sub-region, and overlaying a portion of the first sub-region on a portion of the second sub-region. Additionally or alternatively, the processor may generate the abnormal region by dividing the at least partial region of the one or more first pathological slide images into a plurality of sub-regions, generating an image including a region having a change in at least one of the position, shape, size, or angle of each of the divided plurality of sub-regions, and combining the generated images.

Figure 7:
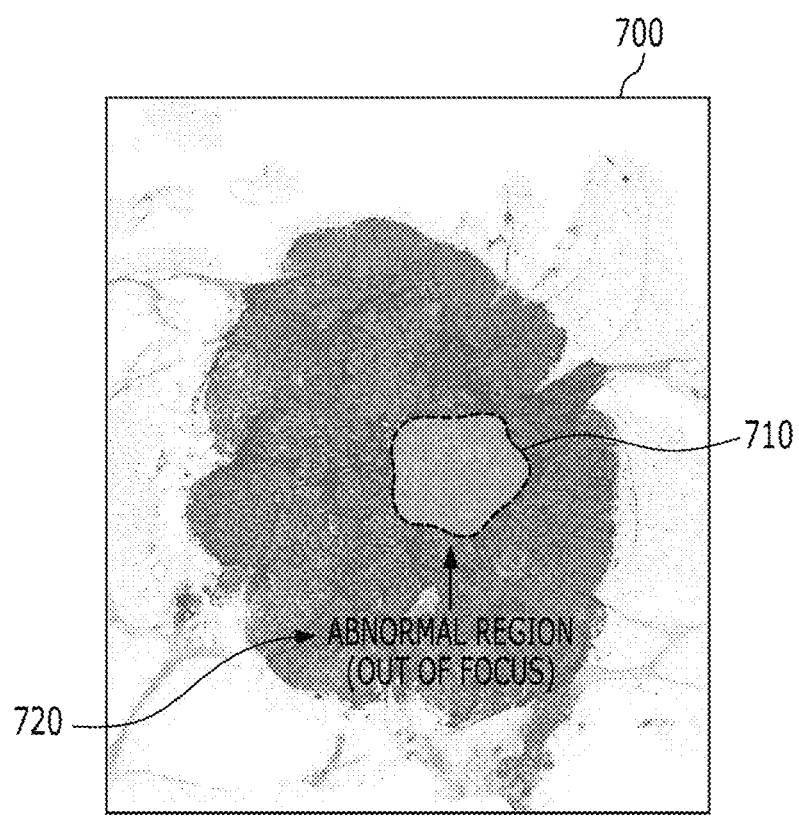
FIG. 7 illustrates an example of an out-of-focus pathological slide image according to an embodiment.

FIG. 7 illustrates an example of an out-of-focus pathological slide image 700 according to an embodiment. As illustrated, the at least partial region of the pathological slide image 700 may be out of focus. In other words, the resolution of the at least partial region of the pathological slide image 700 may be equal to or lower than a predetermined reference. That is, among the regions in the pathological slide image 700, a region having a resolution equal to or lower than the predetermined reference may be determined to be an abnormal region 710 that includes the error information associated with the abnormality condition. As described above, when an analysis algorithm is developed using the pathological slide image 700 that includes the abnormal region 710, the performance of the analysis algorithm may be lowered. Therefore, as described above, it is important to classify and extract the pathological slide image 700 that includes the abnormal region 710 from among various pathological slide images. That is, a machine learning model (e.g., a model for detecting an abnormal region) for detecting the abnormal region 710 and/or the pathological slide image 700 including the abnormal region 710 may be required.

According to an embodiment, in order to train the machine learning model, the processor (e.g., the processor 220 of FIG. 2) may generate the pathological slide image 700 having the at least partial region out of focus as the training data. For example, the processor may generate the abnormal region 710 by applying the blur kernel to the at least partial region in the pathological slide image 700, and generate the training data including the corresponding abnormal region 710. In an example, the blur kernel may be generated in various the sizes and/or shapes. Then, the processor may train the machine learning model by using the generated training data. In other words, the machine learning model may be trained to detect, among the regions in the pathological slide image 700, the abnormal region 710 having resolution equal to or lower than the predetermined reference. In the illustrated example, the abnormal region 710 is not limited to the illustrated shape, and the abnormal region may be configured in any other shape.

According to an embodiment, the processor may detect the abnormal region 710 by using the machine learning model trained to detect the abnormal region 710 in the pathological slide image 700. When the pathological slide image 700 is input to the trained machine learning model, text 720, etc., which indicates the abnormal region 710 included in the pathological slide image 700, the type ("out of focus") of the abnormal region 710, et, may be output, but embodiments are not limited thereto. For example, when the pathological slide image 700 is input to the trained machine learning model, whether or not the abnormal region is included on the pathological slide image 700 may be output. In another example, when the pathological slide image 700 is input to the trained machine learning model, whether a specific region on the pathological slide image 700 corresponds to the normal region or the abnormal region may be output. In another example, when the pathological slide image 700 is input to the trained machine learning model, the abnormality scores for a plurality of regions included in the pathological slide image 700 may also be output.

Figure 8:
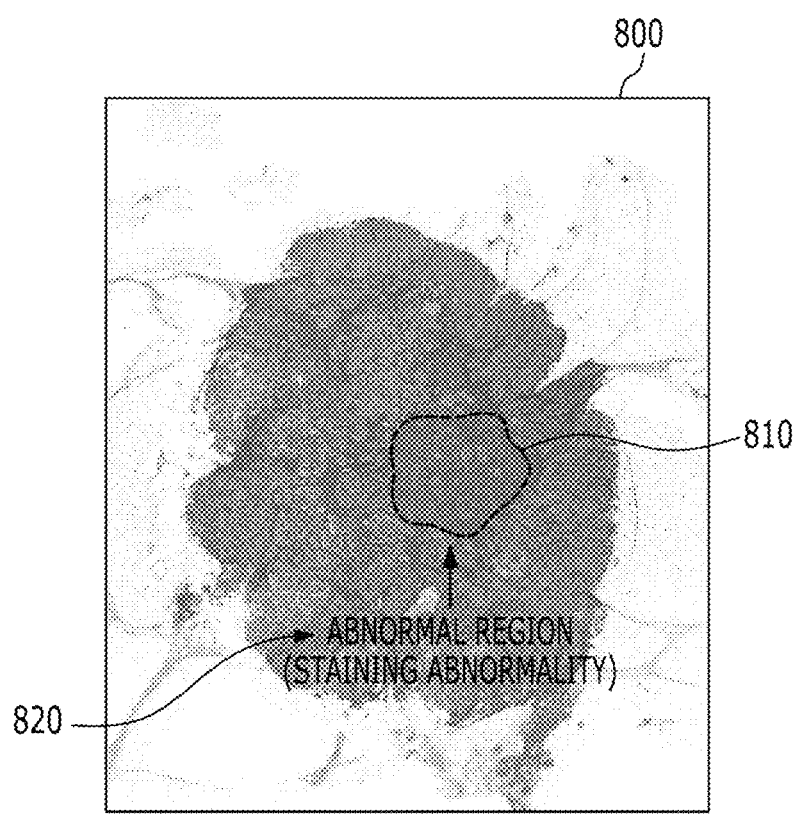
FIG. 8 illustrates an example of a pathological slide image having a staining abnormality according to an embodiment.

FIG. 8 illustrates an example of a pathological slide image 800 having a staining abnormality according to an embodiment. As illustrated, the staining abnormality may occur in the at least partial region of the pathological slide image 800. In other words, the color of the at least partial region of the pathological slide image 800 may be stained with a color inappropriate for analysis. That is, among the regions in the pathological slide image 800, the region stained with a color different from a predetermined reference may be determined to be an abnormal region 810 that includes error information. As described above, when an analysis algorithm is developed using the pathological slide image 800 that includes the abnormal region 810, the performance of the analysis algorithm may be lowered. Therefore, as described above, it is important to classify and extract the pathological slide image 800 that includes the abnormal region 810 from among various pathological slide images. That is, a machine learning model (e.g., a model for detecting an abnormal region) for detecting the abnormal region 810 and/or the pathological slide image 800 including the abnormal region 810 may be required.

According to an embodiment, in order to train the machine learning model, the processor (e.g., the processor 220 of FIG. 2) may generate the pathological slide image 800 having the staining abnormality in the at least partial region as the training data. For example, the processor may generate the abnormal region by applying a color transformation function to the at least partial region of the pathological slide image 800, and generate the training data including the generated abnormal region. In an example, the color transformation function may be generated in various ways, and generated by adjusting the hue to any value or by multiplying the RGB vector for the at least partial region of the pathological slide image 800 by any matrix and projecting it, for example. Then, the processor may train the machine learning model by using the generated training data. In other words, the machine learning model may be trained to detect the abnormal region 810 stained with a color unsuitable for analysis, among the regions in the pathological slide image 800. In the illustrated example, the abnormal region 810 is not limited to the illustrated shape, and the abnormal region may be configured in any other shape.

According to an embodiment, the processor may detect the abnormal region 810 by using the machine learning model trained to detect the abnormal region 810 in the pathological slide image 800. When the pathological slide image 800 is input to the trained machine learning model, text 820, etc., which indicates the abnormal region 810 included in the pathological slide image 800, the type ("staining abnormality") of the abnormal region 810, etc., may be output, but embodiments are not limited thereto. For example, when the pathological slide image 800 is input to the trained machine learning model, whether or not the abnormal region having the staining abnormality is included on the pathological slide image 800 may be output. In another example, when the pathological slide image 800 is input to the trained machine learning model, whether a specific region on the pathological slide image 800 corresponds to the normal region or the abnormal region may be output. In another example, when the pathological slide image 800 is input to the trained machine learning model, the abnormality scores for a plurality of regions included in the pathological slide image 800 may also be output.

Figure 9:
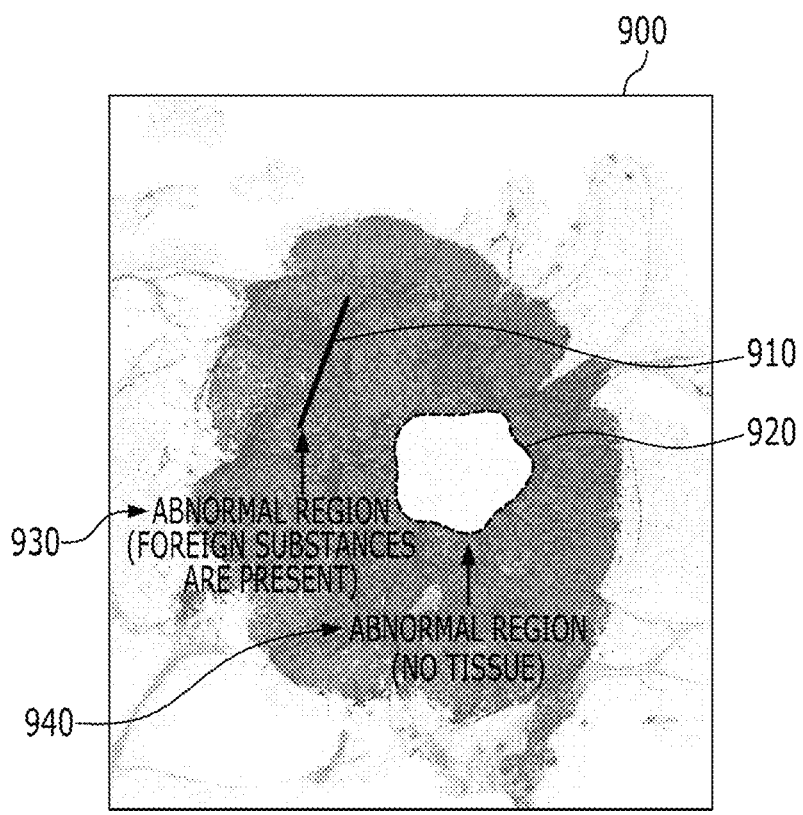
FIG. 9 illustrates an example of a pathological slide image including foreign substances and not including a tissue to be analyzed, according to an embodiment.

FIG. 9 illustrates an example of a pathological slide image 900 including foreign substances and not including a tissue to be analyzed, according to an embodiment. As illustrated, the foreign substances may be present in the at least partial region of the pathological slide image 900, and the tissue to be analyzed may not be included in the same at least partial region or in a different partial region. In other words, the at least partial region of the pathological slide image 900 may include a geometric figure in such a form that is inappropriate for analysis such as point, line, curved line, plane, solid, etc. and/or an image including the geometric figure, and may not include the tissue to be analyzed due to a blank, etc. That is, a region in the pathological slide image 900, which includes any other points, lines, curved lines, etc., and/or a region not including the tissue to be analyzed may be determined to be abnormal regions 910 and 920. As described above, when an analysis algorithm is developed using the pathological slide image 900 including the abnormal regions 910 and 920, the performance of the analysis algorithm may be lowered. Therefore, as described above, it is important to classify and extract the pathological slide image 900 that includes the abnormal region 910 from among various pathological slide images. That is, a machine learning model (e.g., a model for detecting an abnormal region) for detecting the abnormal region 910 and/or the pathological slide image 900 including the abnormal region 910 may be required.

According to an embodiment, in order to train the machine learning model, the processor (e.g., the processor 220 of FIG. 2) may generate, as the training data, the pathological slide image 900 in which foreign substances are included in the at least partial region and/or in which the tissue to be analyzed is not present. For example, the processor may generate the abnormal region by applying at least one of a specific color or a specific brightness to the at least partial region in the pathological slide image 900, and generate the training data including the generated abnormal region. In another example, the processor may generate the abnormal region by inserting a geometric figure into the at least partial region of the pathological slide image 900, and generate the training data including the generated abnormal region. In an example, the processor may generate the training data including the abnormal region by compositing an image including the geometric figure such as points, lines, planes, etc. having any thicknesses, colors, etc. with the pathological slide image 900, or transform a partial region into a white region. Then, the processor may train the machine learning model by using the generated training data. In other words, the machine learning model may be trained to detect, among the regions in the pathological slide image 800, the abnormal region 910 in which foreign substances are present or in which the tissue to be analyzed is not included. In the illustrated example, the abnormal region 910 is not limited to the illustrated shape, and the abnormal region may be configured in any other shape. In addition, while it is illustrated that the abnormal region 920 is straight line, embodiments are not limited thereto, and it may be formed as other image such as a curved line, a point, etc.

According to an embodiment, the processor may detect the abnormal regions 910 and 920 by using the machine learning model trained to detect the abnormal regions 910 and 920 in the pathological slide image 900. When the pathological slide image 900 is input to the trained machine learning model, texts 930 and 940, etc., which indicate the abnormal regions 910 and 920 included in the pathological slide image 900, the type ("foreign substances are present," "no tissue") of the abnormal regions 910 and 920, etc., may be output, but embodiments are not limited thereto. For example, when the pathological slide image 900 is input to the trained machine learning model, whether or not the foreign substances are included and/or whether or not the tissue to be analyzed is present on the pathological slide image 900 may be output. In another example, when the pathological slide image 900 is input to the trained machine learning model, whether a specific region on the pathological slide image 900 corresponds to the normal region or the abnormal region may be output. In another example, when the pathological slide image 900 is input to the trained machine learning model, the abnormality scores for a plurality of regions included in the pathological slide image 900 may also be output.

Figure 10:
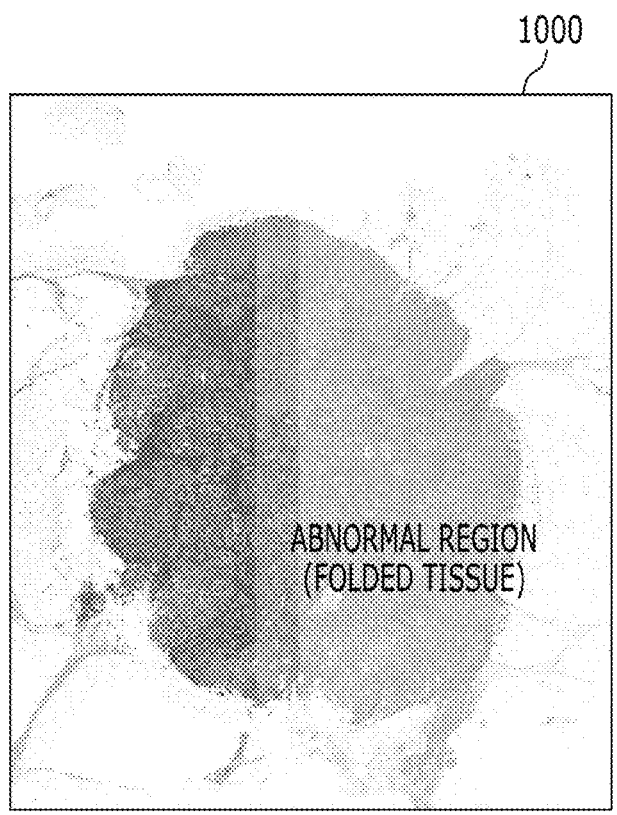
FIG. 10 illustrates an example of a pathological slide image having a folded tissue phenomenon according to an embodiment.

FIG. 10 illustrates an example of a pathological slide image 1000 having a folded tissue phenomenon according to an embodiment. As illustrated, the folded tissue phenomenon may be generated in the at least partial region of the pathological slide image 1000. In other words, the at least partial region of the pathological slide image 1000 may be displayed in an overlaid manner. That is, among the regions in the pathological slide image 1000, a region having the folded tissue phenomenon may be determined to be the abnormal region that includes the error information. As described above, when an analysis algorithm is developed using the pathological slide image 1000 that includes the abnormal region, the performance of the analysis algorithm may be lowered. Therefore, as described above, it is important to classify and extract the pathological slide image 1000 that includes the abnormal region 1010 from among various pathological slide images. That is, a machine learning model (e.g., a model for detecting an abnormal region) for detecting the abnormal region 1010 and/or the pathological slide image 1000 including the abnormal region 1010 may be required.

According to an embodiment, in order to train the machine learning model, the processor (e.g., the processor 220 of FIG. 2) may generate the pathological slide image 1000 having the folded tissue phenomenon in the at least partial region as the training data. For example, the processor may generate the abnormal region by dividing the at least partial region of the pathological slide image 1000 into a first sub-region and a second sub-region, and overlaying a portion of the first sub-region on a portion of the second sub-region, and generate the training data including the generated abnormal region. For example, the processor may generate the folded tissue phenomenon by dividing the at least partial region of the pathological slide image 1000 based on a straight line or a curved line as a boundary and overlaying them with any transparency. In this case, the area of the overlaid region may be arbitrarily determined. Then, the processor may train the machine learning model by using the generated training data. In other words, the machine learning model may be trained to detect the abnormal region 1010 having the folded tissue phenomenon, among the regions in the pathological slide image 1000. In the illustrated example, it is illustrated that the pathological slide image 1000 is divided into sub-regions based on the straight line as a boundary, but is not limited thereto, and may be divided based on a curved line as a boundary.

According to an embodiment, the processor may detect the abnormal region using the machine learning model trained to detect the abnormal region in the pathological slide image 1000. When the pathological slide image 1000 is input to the trained machine learning model, the text, etc., which indicates the abnormal region included in the pathological slide image 1000, the type ("folded tissue") of the abnormal region, etc., may be output, but embodiments are not limited thereto. For example, when the pathological slide image 1000 is input to the trained machine learning model, whether or not the abnormal region having the folded tissue phenomenon is included on the pathological slide image 1000 may be output. In another example, when the pathological slide image 1000 is input to the trained machine learning model, whether a specific region on the pathological slide image 1000 corresponds to the normal region or the abnormal region may be output. In another example, when the pathological slide image 1000 is input to the trained machine learning model, the abnormality scores for a plurality of regions included in the pathological slide image 1000 may also be output.

Figure 11:
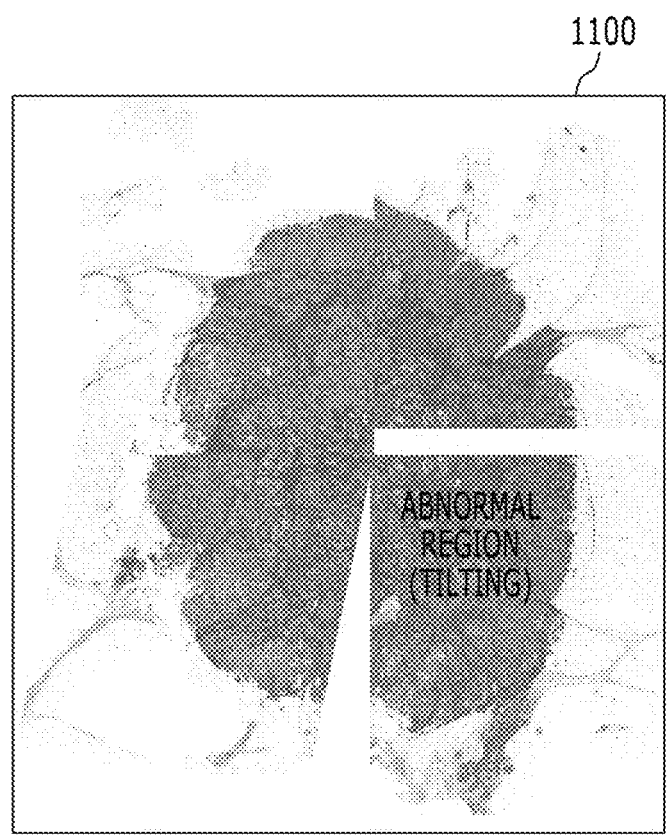
FIG. 11 illustrates an example of a pathological slide image having a tilting effect according to an embodiment.

FIG. 11 illustrates an example of a pathological slide image 1100 having a tilting effect according to an embodiment. As illustrated, the tilting effect may occur on the at least partial region of the pathological slide image 1100. In other words, a change may occur in the shape, angle, position, etc. of the at least partial region of the pathological slide image 1100. That is, among the regions in the pathological slide image 1100, a region having a change in the shape, angle, position, etc. may be determined to be the abnormal region that includes the error information. As described above, when an analysis algorithm is developed using the pathological slide image 1100 that includes the abnormal region, the performance of the analysis algorithm may be lowered. Therefore, as described above, it is important to classify and extract the pathological slide image 1100 that includes the abnormal region 1110 from among various pathological slide images. That is, a machine learning model (e.g., a model for detecting an abnormal region) for detecting the abnormal region 1110 and/or the pathological slide image 1100 including the abnormal region 1110 may be required.

According to an embodiment, in order to train the machine learning model, the processor (e.g., the processor 220 of FIG. 2) may generate the pathological slide image 1100 having the tilting effect in the at least partial region as training data. For example, the processor may generate the abnormal region by dividing the at least partial region of the pathological slide image 1100 into a plurality of sub-regions, generating an image including a region having a change in at least one of the position, shape, size or angle of each of the divided plurality of sub-regions, and combining the generated images, and may generate the training data including the generated abnormal region. In other words, the processor may generate the training data having non-continuous boundary portions of each piece or including a blank space, by dividing any region of the pathological slide image 1100 into several pieces, changing the shape or position of each piece, and then re-attaching or overlapping the pieces. Then, the processor may train the machine learning model by using the generated training data. That is, the machine learning model may be trained to detect the abnormal region 1110 having the tilting effect among the regions in the pathological slide image 1100.

According to an embodiment, the processor may detect the abnormal region using the machine learning model trained to detect the abnormal region in the pathological slide image 1100. When the pathological slide image 1100 is input to the trained machine learning model, the text, etc., which indicates the abnormal region included in the pathological slide image 1100, the type ("tilting") of the abnormal region, etc., may be output, but embodiments are not limited thereto. For example, when the pathological slide image 1100 is input to the trained machine learning model, whether or not the abnormal region having the tilting effect is included on the pathological slide image 1100 may be output. In another example, when the pathological slide image 1100 is input to the trained machine learning model, whether a specific region on the pathological slide image 1100 corresponds to the normal region or the abnormal region may be output. In another example, when the pathological slide image 1100 is input to the trained machine learning model, the abnormality scores for a plurality of regions included in the pathological slide image 1100 may also be output.

In FIGS. 7 to 11, it has been described above that there are respective machine learning models for extracting an abnormal region having a resolution equal to or lower than a predetermined reference, an abnormal region stained with a color inappropriate for analysis, an abnormal region containing foreign substances, an abnormal region including a tissue to be analyzed, an abnormal region having the folded tissue phenomenon, an abnormal region having the tilting effect, etc., but embodiments are not limited thereto. For example, there may be one machine learning model for detecting one type of abnormal region, or there may be one machine learning model for detecting a plurality of types of abnormal regions.

Figure 12:
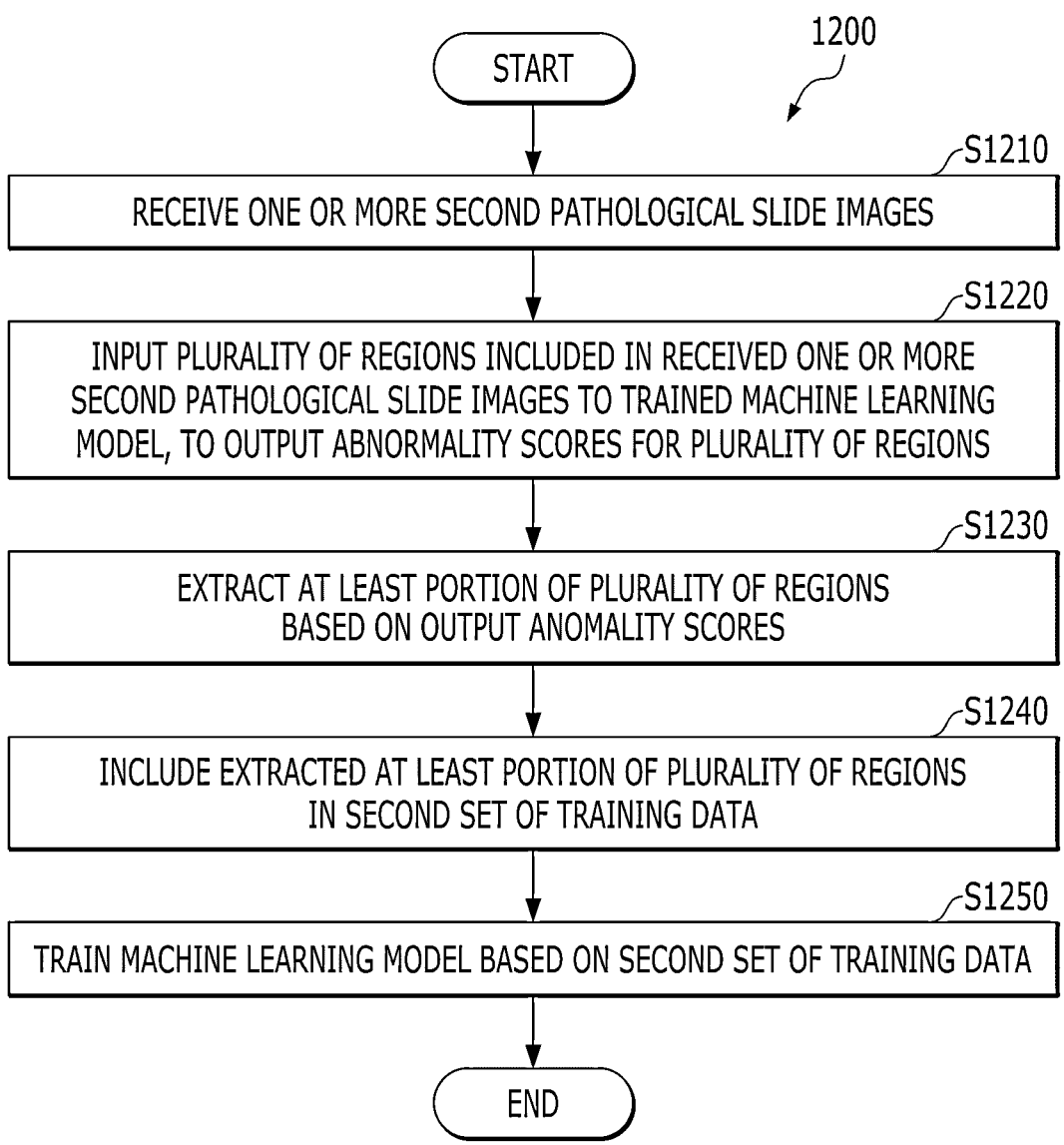
FIG. 12 is a flowchart illustrating a method for training a machine learning model according to an embodiment.

FIG. 12 is a flowchart illustrating a method 1200 for training a machine learning model according to an embodiment. According to an embodiment, the method 1200 for training a machine learning model may be performed by a processor (e.g., at least one processor of the information processing system and/or at least one processor of the user terminal). As illustrated, the method 1200 for training a machine learning model may be initiated by the processor receiving one or more second pathological slide images, at S1210.

The processor may input a plurality of regions included in the received one or more second pathological slide images to the trained machine learning model, to output the abnormality scores for the plurality of regions, at S1220. In addition, the processor may extract at least a portion of the plurality of regions based on the output abnormality scores, at S1230. For example, the processor may extract the top n (n is a natural number) pathological slide images having high abnormality scores. In another example, the processor may also extract the pathological slide images having the abnormality scores equal to or greater than a predetermined score.

The processor may include the at least portion of the plurality of extracted regions in the second set of training data, at S1240. In addition, the processor may train the machine learning model based on a second set of training data, at S1250. Through the process as described above, the processor may continuously generate the training data automatically and/or semi-automatically. For example, the processor may automatically generate additional training data through the process described above. In another example, the processor may semi-automatically generate additional training data in response to receiving a user input for checking or reviewing the training data generated through the process described above.

Figure 13:
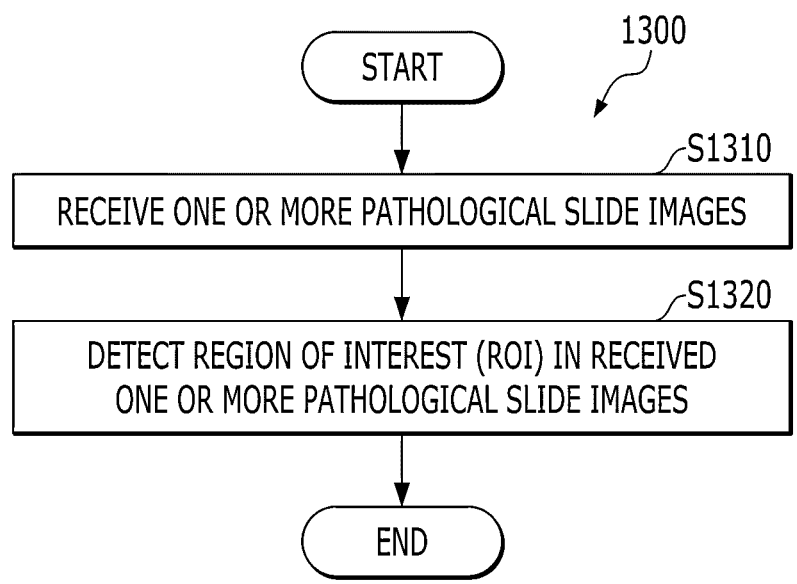
FIG. 13 is a flowchart illustrating a method for detecting an ROI in a pathological slide image according to an embodiment.

FIG. 13 is a flowchart illustrating a method 1300 for detecting an ROI in a pathological slide image according to an embodiment. According to an embodiment, the method 1300 for detecting an ROI may be performed by a processor (e.g., at least one processor of the information processing system and/or at least one processor of the user terminal). As illustrated, the method 1300 for detecting an ROI may be initiated by the processor receiving one or more pathological slide images, at S1310. In an example, the pathological slide image may include a whole pathological slide and/or a partial region in the pathological slide image, such as a patch.

When receiving the pathological slide image, the processor may detect an ROI in the received one or more pathological slide images, at S1320. The processor may detect an ROI by performing image processing with respect to the received one or more pathological slide images. According to an embodiment, for the detection of the ROI, a numerical value for a feature of a plurality of pixels included in one or more pathological slide images and a threshold value for the feature may be used. For example, the processor may detect the ROI in the one or more pathological slide images by using a thresholding technique (e.g., Otsu thresholding technique, etc.) for color and/or intensity of a plurality of pixels. In another embodiment, the processor may detect the ROI in the one or more pathological slide images by detecting a contour of one or more objects included in the one or more pathological slide images. In an example, as a technique for detecting a contour, any known segmentation technique may be used, and for example, a machine learning technique such as an active contouring technique, etc. may be used, but embodiments are not limited thereto. According to still another embodiment, the processor may detect the ROI in the one or more pathological slide images by using a machine learning model. Additionally or alternatively, the processor may detect the ROI in the one or more pathological slide images by using annotation information on the ROI included in the one or more pathological slide images.

Figure 14:
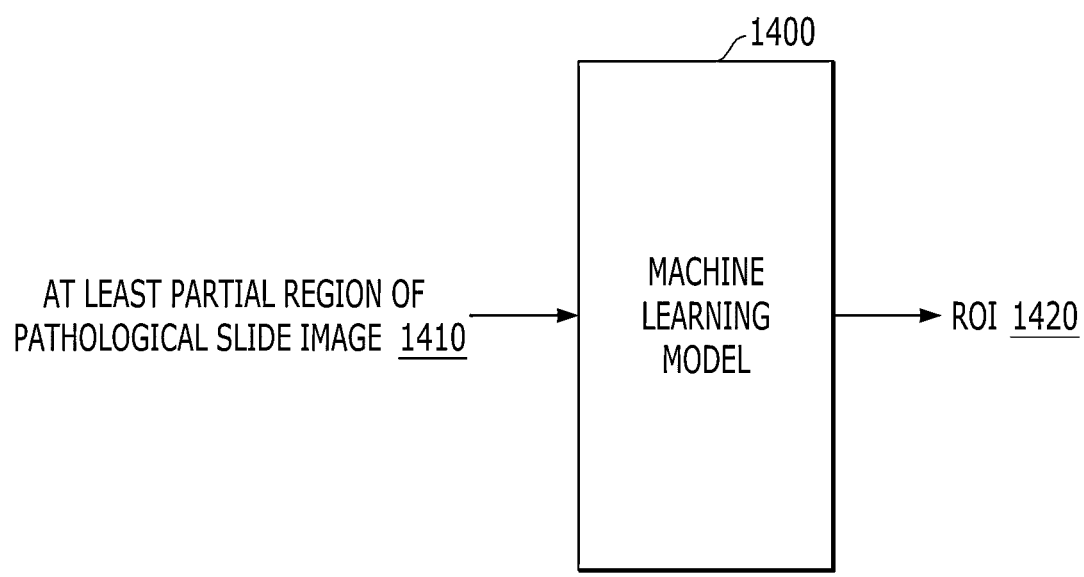
FIG. 14 illustrates an example of a machine learning model according to another embodiment.

FIG. 14 illustrates an example of a machine learning model 1400 according to another embodiment. The processor (e.g., the processor 220 of FIG. 2) may use the machine learning model 1400 to extract the ROI in the received one or more pathological slide images. As illustrated, the machine learning model 1400 may receive at least partial region 1410 of the pathological slide image, and detect an ROI 1420 in the at least partial region 1410 of the received pathological slide image. In an example, the ROI is a target region that is required or to be used for any processing task (e.g., analysis task, prediction task, etc.) with respect to the pathological slide image, and may refer to any region in the pathological slide image. In an embodiment, the ROI may refer to a region including one or more objects in the pathological slide image which are required or to be used for the above tasks, etc. For example, these one or more objects may include tumor cells, immune cells, tissues, etc., but are not limited thereto. In the present disclosure, the machine learning model 1400 may include a convolution-based segmentation model trained to perform labeling with respect to each of a plurality of pixels included in one or more pathological slide images.

According to an embodiment, the machine learning model 1400 may be trained to detect regions of interests (ROIs) in a plurality of reference pathological slide images by using training data that includes the plurality of reference pathological slide images and information on a plurality of reference labels. In an example, the plurality of reference pathological slide images may refer to reference pathological slide images that are collected to be used as the training data of the machine learning model 1400. In addition, the information on the plurality of reference labels may refer to label information for one or more ROIs in the plurality of reference pathological slide images. For example, the information on the plurality of reference labels may be generated by a medical practitioner's annotations on the ROIs in the plurality of reference pathological slide images. In another example, the information on the plurality of reference labels may refer to label information output as a result of performing image processing with respect to the reference pathological slide images or output by a machine learning method, before the ROIs are detected through the machine learning model 1400.

According to an embodiment, the processor may detect the ROI in the one or more pathological slide images using the machine learning model 1400, by excluding a region in the one or more pathological slide images that are not associated with one or more tissues of the patient. In an example, the one or more pathological slide images may be associated with one or more patients. In addition, the plurality of reference pathological slide images, which are the training data of the machine learning model 1400, may include regions including tissues of a plurality of patients associated with the plurality of reference pathological slides and regions not associated with the tissues of the plurality of patients. In addition, the information on the plurality of reference labels, which is the training data of the machine learning model 1400, may include information indicative of the region not associated with the tissues of the plurality of patients. In an example, the "region not associated with the tissues of the patient" may refer to any region that is not associated with the tissues of the patient from whom the pathological slide images or reference pathological slide images are captured. For example, it may include a region showing a reference tissue included in the pathological slide image or the reference pathological slide image, a background region, a region indicated with a marker, etc., but is not limited thereto. By using the training data, the machine learning model 1400 may be trained to exclude, from the plurality of reference pathological slide images, regions not associated with the tissues of the plurality of patients associated with the plurality of reference pathological slide images.

According to an embodiment, the machine learning model 1400 may receive an image obtained by down-sampling at least partial region of the one or more pathological slide images. In response, an ROI in the image subjected to down-sampling may be output from the machine learning model 1400. For example, the processor may perform down-sampling with respect to the one or more pathological slide images. In another example, the image subjected to down-sampling may be received from a separate system. In addition, the plurality of reference pathological slide images as the training data of the machine learning model 1400 may be pathological slide images not subjected to down-sampling. Alternatively, the plurality of reference pathological slide images may be pathological slide images subjected to down-sampling.

Figure 15:
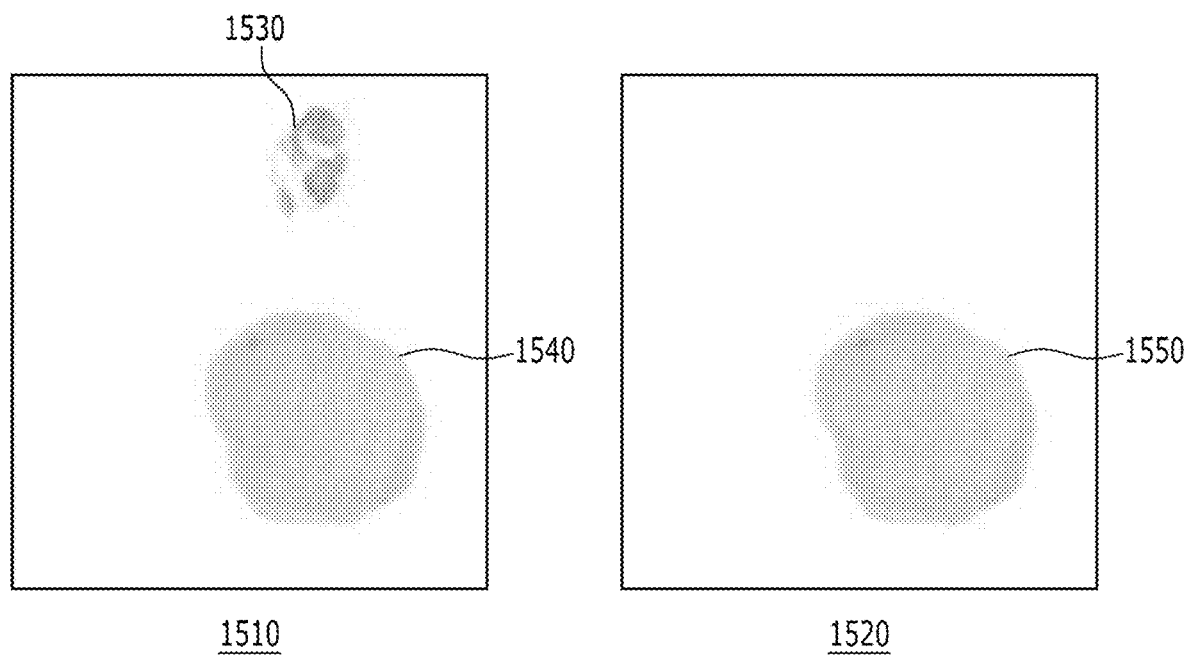
FIG. 15 illustrates an example of an image in which a reference tissue is excluded from a pathological slide image.

FIG. 15 illustrates an example of an image 1520 showing that a reference tissue 1530 is excluded from a pathological slide image 1510. As illustrated, the pathological slide image 1510 may include a tissue 1540 of a patient and the reference tissue 1530. For example, the pathological slide image 1510 may refer to an image stained with IHC (immunohistochemical). In an example, the reference tissue 1530 may refer to a tissue (e.g., an in-house control tissue, etc.) corresponding to the tissue of the patient, which has been previously extracted from another person and stained with IHC.

According to an embodiment, the processor (e.g., the processor 220 of FIG. 2) may detect an ROI 1550 in the one or more pathological slide images by excluding the region showing the reference tissue 1530 in the one or more pathological slide images 1510 by using the machine learning model (e.g., the machine learning model 1400). For example, the image 1520 including the detected ROI 1550 may be generated. In this case, each of the one or more pathological slide images and the plurality of pathological slide images to be used as the training data of the machine learning model may be images stained with IHC (immunohistochemical). At this time, the reference tissue may be placed around the stained tissue of the patient before the IHC-stained tissue is viewed through a microscope or generated as the pathological slide image. With this configuration, the reference tissue may be a comparison target for the stained tissue of the patient, and may be used to evaluate whether or not the patient's staining was performed properly or used for a specific purpose/analysis/prediction.

Figure 16:
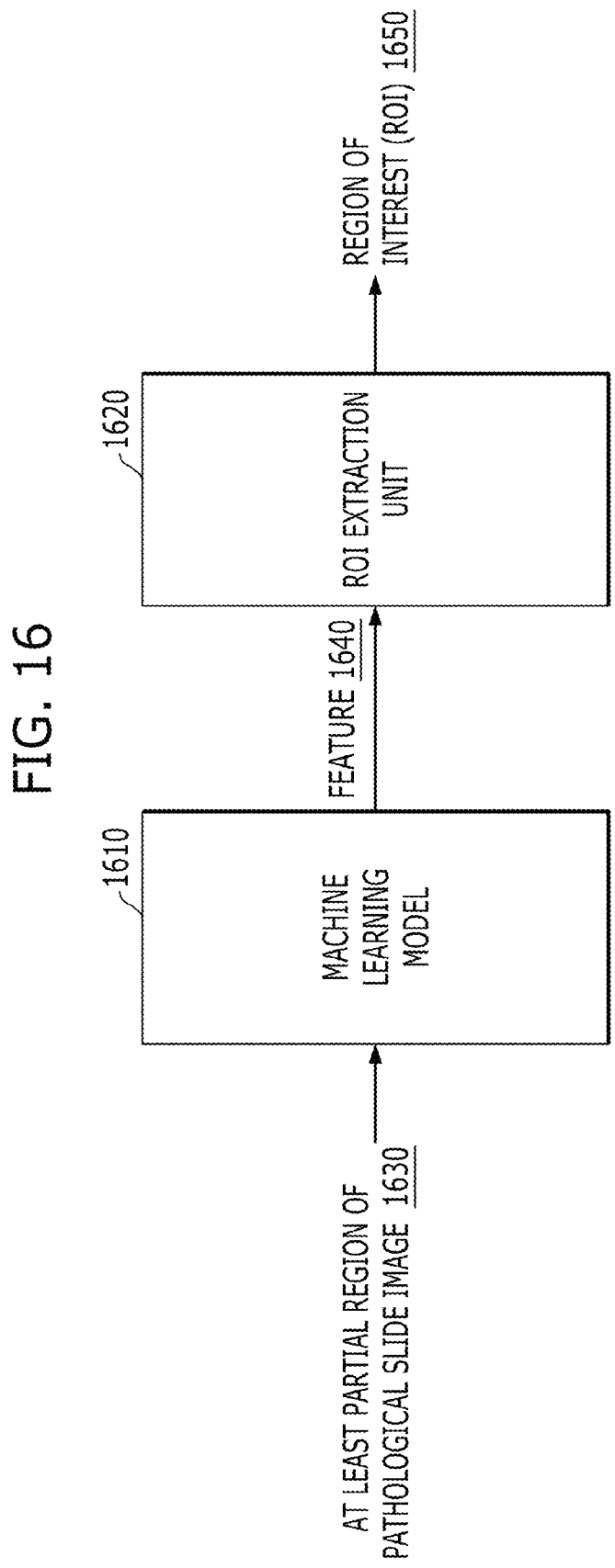
FIG. 16 illustrates an example of a method for extracting an ROI using a feature of a pathological slide image extracted through a machine learning model.

FIG. 16 illustrates an example of a method for extracting an ROI 1650 using a feature 1640 of a pathological slide image extracted through a machine learning model 1610. The processor (e.g., the processor 220 of FIG. 2) may extract a feature of one or more objects in the one or more pathological slide images using the machine learning model 1610. As illustrated, the machine learning model 1610 may receive at least partial region 1630 of the pathological slide image, and output the feature 1640 of one or more objects included in the pathological slide image. In an example, the one or more objects may refer to any cell, tissue, structure, etc. included in the pathological slide image, but are not limited thereto.

According to an embodiment, the processor may be configured to detect the ROI in the one or more pathological slide images by using the extracted features and the predetermined condition. As illustrated, an ROI extraction unit 1620 may receive the feature 1640 output through the machine learning model 1610, and determine whether or not the received feature 1640 meets a predetermined condition, and thereby determine the ROI 1650. In an example, the predetermined condition may be determined depending on which ROI is required for the specific analysis and/or prediction task with respect to the pathological slide image. In this case, medical findings may be used to determine the conditions for the ROI. For example, the predetermined condition may refer to a condition that a specific number (e.g. 100, etc.) or more of tumor cells be present in a specific region (e.g., 1 High Power Field (HPF), etc.). Such a condition may be a condition required for determining an expression level or an expression ratio of PD-L1 in tumor cells included in the specific region. That is, the numerical value of the expression level or expression ratio determined in the ROI meeting this condition may be a meaningful region from a medical point of view.

Figure 17:
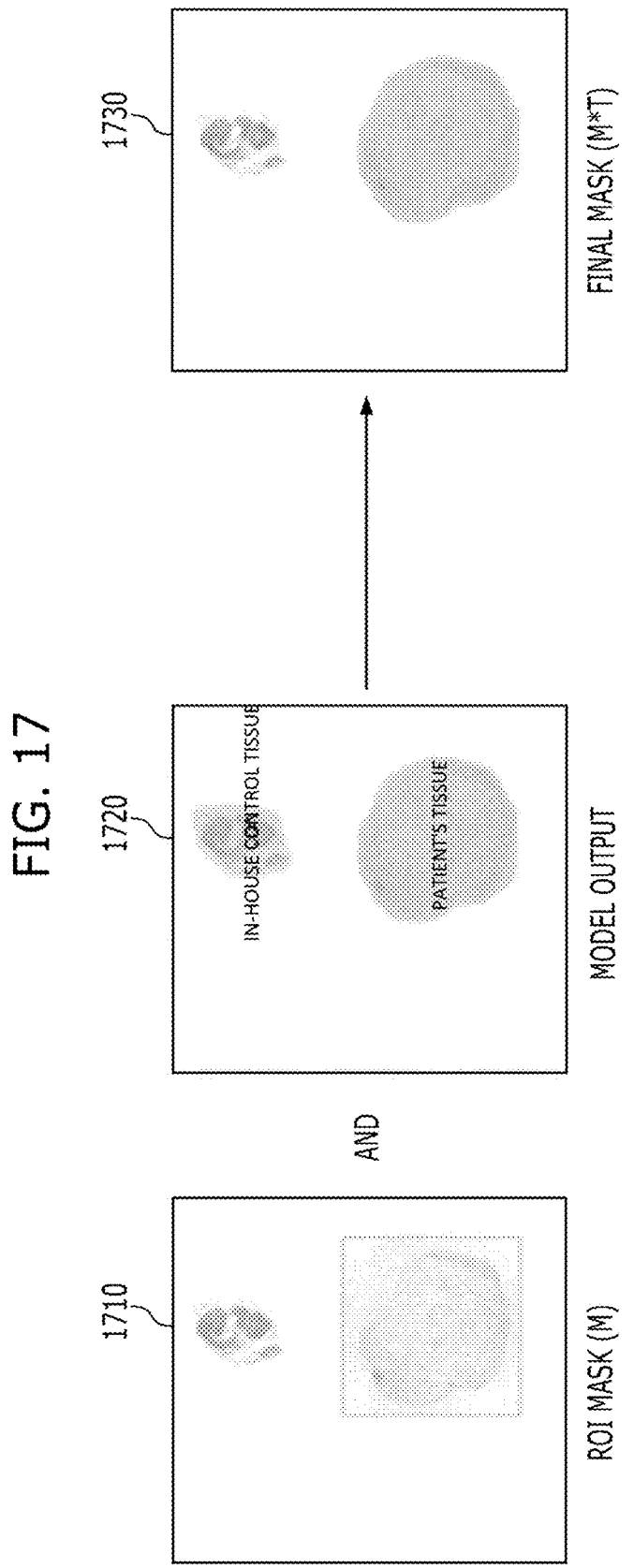
FIG. 17 illustrates an example of a method for detecting an ROI in a pathological slide image by using annotation information on the pathological slide image and a detected tissue region of the pathological slide image.

FIG. 17 illustrates an example of a method for detecting an ROI in a pathological slide image by using annotation information on the pathological slide image and a detected tissue region of the pathological slide image. An image 1710 may include annotations for candidate ROIs (regions of interest) in the pathological slide image. For example, such annotations may be performed manually by a person (e.g., a medical practitioner) or by using a computing device. In an example, the annotation on the candidate ROIs may be roughly indicated or displayed in the image. That is, any indication for indicating or pointing the candidate ROIs may be employed as the annotation, without requiring a practitioner indicating the candidate ROIs precisely (e.g., without marking the contour of the ROI). As illustrated in the image 1710, the annotation for the ROI is indicated in a box form covering a wider region than the candidate ROI, but embodiments are not limited thereto, and any method (e.g., a circle, a check mark, etc.) for displaying or indicating the candidate ROI may be used.

According to an embodiment, the image 1720 may include one or more tissue regions in the one or more pathological slide images. As illustrated, the image 1720 may include the tissue of the patient and the in-house control tissue. Such one or more tissues may be detected by performing image processing with respect to the pathological slide image. Additionally or alternatively, a processor (e.g., the processor 220 of FIG. 2) may detect one or more tissues from the pathological slide image by using a machine learning model trained to output a tissue region from the pathological slide image.

Then, the processor may detect the ROI in the one or more pathological slide images by using the candidate ROIs and the detected one or more tissue regions. As illustrated, the processor may detect the ROI in the one or more pathological slide images by using the candidate ROIs included in the image 1710 and a plurality of tissue regions included in the image 1720. In the present disclosure, a region for the tissue located on the lower side in an image 1730 may be determined to be the ROI. In this example, although the ROI is indicated in a specific color, embodiments are not limited thereto, and the ROI may be indicated with any method.

Figure 18:
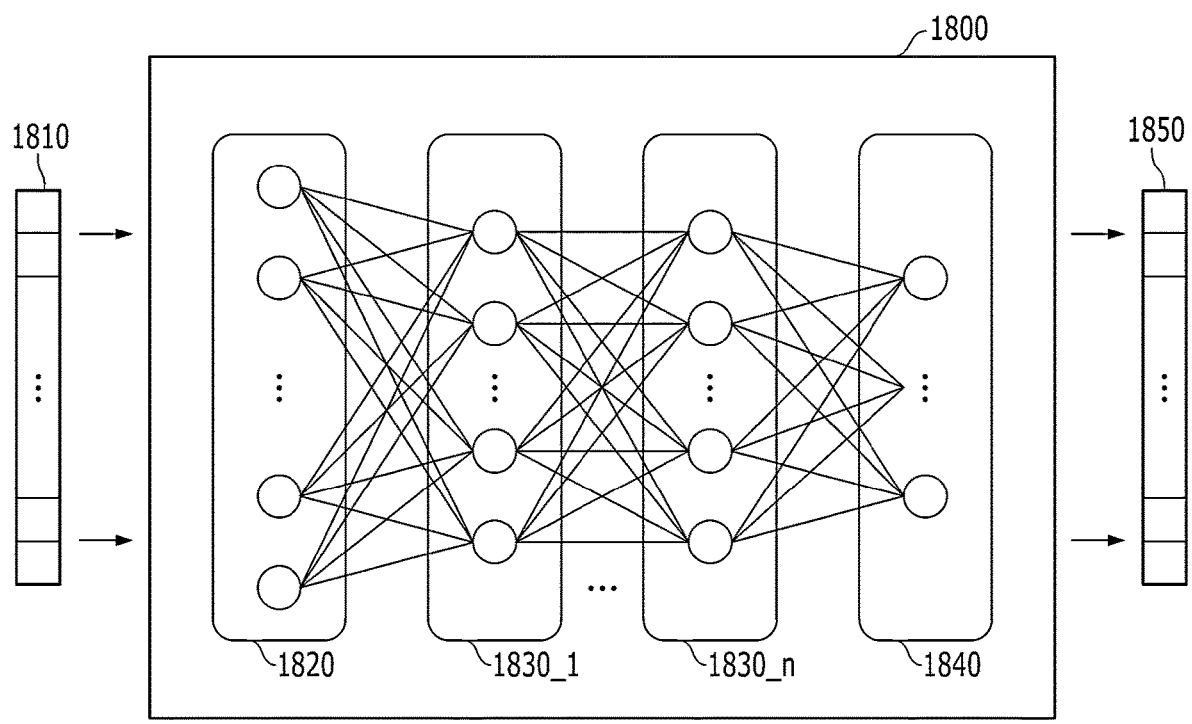
FIG. 18 is an exemplary diagram illustrating an artificial neural network model according to an embodiment.

FIG. 18 is an exemplary diagram illustrating an artificial neural network model 1800 according to an embodiment. In machine learning technology and cognitive science, an artificial neural network model 1800 as an example of the machine learning model refers to a statistical learning algorithm implemented based on a structure of a biological neural network, or to a structure that executes such algorithm.

According to an embodiment, the artificial neural network model 1800 may represent a machine learning model that acquires a problem solving ability by repeatedly adjusting the weights of synapses by the nodes that are artificial neurons forming the network through synaptic combinations as in the biological neural networks, thus training to reduce errors between a target output corresponding to a specific input and a deduced output. For example, the artificial neural network model 1800 may include any probability model, neural network model, etc., that is used in artificial intelligence learning methods such as machine learning and deep learning.

The machine learning model for detecting the abnormal region described above may be generated in the form of the artificial neural network model 1800. According to an embodiment, as an implementation of the machine learning model 500, the artificial neural network model 1800 may be trained to receive one or more pathological slide images, and detect an abnormal region meeting the abnormality condition in the received one or more pathological slide images. For example, the artificial neural network model 1800 may include a classifier that determines whether each region corresponds to a normal region or an abnormal region for each region in the one or more pathological slide images. In another example, the artificial neural network model 1800 may include a segmentation model that performs labeling on pixels included in the abnormal region in the one or more pathological slide images.

According to another embodiment, as an implementation of the machine learning model 1400, the artificial neural network model 1800 may be trained to receive one or more pathological slide images, and detect an ROI in the received one or more pathological slide images. In another embodiment, as an implementation of the machine learning model 1610, the artificial neural network model 1800 may be trained to receive one or more pathological slide images, and extract features for one or more objects (e.g., cells, objects, structures, etc.) in the received one or more pathological slide images. According to still another embodiment, the artificial neural network model 1800 may be trained to receive one or more pathological slide images and detect tissue regions in the received one or more pathological slide images.

The artificial neural network model 1800 is implemented as a multilayer perceptron (MLP) formed of multiple nodes and connections between them. The artificial neural network model 1800 according to an embodiment may be implemented using one of various artificial neural network model structures including the MLP. As illustrated in FIG. 18, the artificial neural network model 1800 includes an input layer 1820 to receive an input signal or data 1810 from the outside, an output layer 1840 to output an output signal or data 1850 corresponding to the input data, and (n) number of hidden layers 1830_1 to 1830_n (where n is a positive integer) positioned between the input layer 1820 and the output layer 1840 to receive a signal from the input layer 1820, extract the features, and transmit the features to the output layer 1840. In an example, the output layer 1840 receives signals from the hidden layers 1830_1 to 1830_n and outputs them to the outside.

The method for training the artificial neural network model 1800 includes the supervised learning that trains to optimize for solving a problem with inputs of teacher signals (correct answers), and the unsupervised learning that does not require a teacher signal. According to an embodiment, the information processing system may train the artificial neural network model 1800 by using a plurality of pathological slide images that include an abnormal region including the error information associated with the abnormality condition.

According to an embodiment, the information processing system may directly generate the training data for training the artificial neural network model 1800. The information processing system may receive one or more pathological slide images, and determine, from the one or more pathological slide images, a normal region based on an abnormality condition indicative of the condition of an abnormal region, and generate a first set of training data including the determined normal region. In addition, the information processing system may generate the abnormal region by performing image processing corresponding to the abnormality condition with respect to the at least partial region in the received one or more pathological slide images, and generate a second set of training data including the generated abnormal region. Then, the information processing system may train the artificial neural network model 1800 for detecting an abnormal region in one or more pathological slide images based on the generated first and second sets of training data.

According to another embodiment, by using the training data including a plurality of reference pathological slide images and information on a plurality of reference labels, the information processing system may train the artificial neural network model 1800 to detect the ROI in the plurality of received reference pathological slide images. For example, the artificial neural network model 1800 may be trained to exclude regions (e.g., reference tissues, etc.) not associated with tissues of the plurality of patients associated with the plurality of reference pathological slide images. According to still another embodiment, by using the training data including the plurality of reference pathological slide images and reference features for reference objects in the plurality of reference pathological slide images, the information processing system may train the artificial neural network model 1800 to extract the features for the reference objects in the plurality of received reference pathological slide images. According to still another embodiment, by using the training data including the plurality of reference pathological slide images and the reference tissue regions in the plurality of reference pathological slide images, the information processing system may train the artificial neural network model 1800 to detect the reference tissue regions in the plurality of reference pathological slide images.

According to an embodiment, the input variable of the artificial neural network model 1800 may include the one or more pathological slide images. Additionally or alternatively, the input variable of the artificial neural network model 1800 may include the first set of training data including a normal region, the second set of training data including the abnormal region associated with one or more error information, etc. As described above, when the input variable described above is input through the input layer 1820, for example, the output variable output from the output layer 1840 of the artificial neural network model

1800 may be a vector indicating or characterizing whether each region in the one or more pathological slide images corresponds to the normal region or the abnormal region, the labeling for pixels corresponding to the abnormal region in the one or more pathological slide images, the abnormality scores for a plurality of regions in one or more pathological slide images, etc. In another example, the output variable output from the output layer 1840 of the artificial neural network model 1800 may be a vector indicating or characterizing whether or not it corresponds to the ROI in the one or more slide images, the labeling for pixels corresponding to the ROI in the one or more pathological slide images, the scores for how close the plurality of regions in one or more pathological slide images are to ROI, etc. In another example, the output variable output from the output layer 1840 of the artificial neural network model 1800 may be a vector indicating or characterizing a feature of one or more objects in the one or more pathological slide images. In another example, the output variable output from the output layer 1840 of the artificial neural network model 1800 may be a vector indicating or characterizing one or more tissue regions in the one or more pathological slide images.

As described above, the input layer 1820 and the output layer 1840 of the artificial neural network model 1800 are respectively matched with a plurality of output variables corresponding to a plurality of input variables, and the synaptic values between nodes included in the input layer 1820, the hidden layers 1830_1 to 1830_n, and the output layer 1840 are adjusted, so that by training, a correct output corresponding to a specific input can be extracted. Through this training process, the features hidden in the input variables of the artificial neural network model 1800 may be confirmed, and the synaptic values (or weights) between the nodes of the artificial neural network model 1800 may be adjusted so as to reduce the errors between the output variable calculated based on the input variable and the target output.

According to an embodiment, the artificial neural network model 1800 may be coupled and/or combined with one or more other machine learning models, etc. For example, the abnormal region detected by the artificial neural network model 1800 and/or information on the abnormal region may be provided to another machine learning model, in which case another machine learning model may automatically exclude the detected abnormal regions from its inference process. For example, the machine learning model may exclude the detected abnormal region from the whole region of the pathological slide image or from a valid region which is a significant region to be inferred, and infer the ROI based on the remaining region. In another example, another machine learning model may make an inference so as to include the detected abnormal regions. In another example, another machine learning model may make an inference by utilizing the detected abnormal regions.

Figure 19:
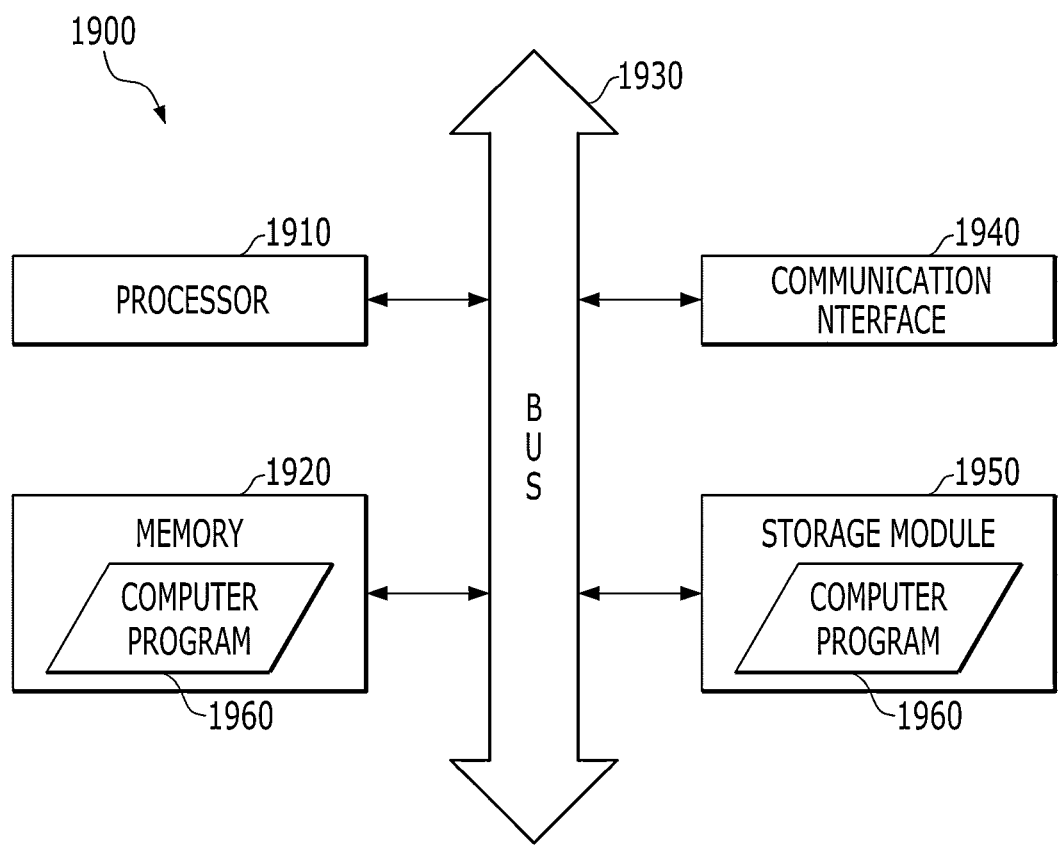
FIG. 19 is a block diagram of any computing device associated with detecting the abnormal region in the pathological slide image according to an embodiment.

FIG. 19 is a block diagram of any computing device 1900 associated with detecting the abnormal region in the pathological slide image according to an embodiment. For example, the computing device 1900 may include the information processing system 120 and/or the user terminal 130. As illustrated, the computing device 1900 may include one or more processors 1910, a bus 1930, a communication interface 1940, a memory 1920 for loading a computer program 1960 to be executed by the processors 1910, and a storage module 1950 for storing the computer program 1960. However, only the components related to the embodiment of the present disclosure are illustrated in FIG. 19. Accordingly, those of ordinary skill in the art to which the present disclosure pertains will be able to recognize that other general-purpose components may be further included in addition to the components shown in FIG. 19.

The processors 1910 control the overall operation of each component of the computing device 1900. The processors 1910 may be configured to include a central processing unit (CPU), a micro processor unit (MPU), a micro controller unit (MCU), a graphic processing unit (GPU), or any type of processor well known in the technical field of the present disclosure. In addition, the processors 1910 may perform an arithmetic operation on at least one application or program for executing the method according to the embodiments of the present disclosure. The computing device 1900 may include one or more processors.

The memory 1920 may store various types of data, commands, and/or information. The memory 1920 may load one or more computer programs 1960 from the storage module 1950 in order to execute the method/operation according to various embodiments of the present disclosure. The memory 1920 may be implemented as a volatile memory such as RAM, but the technical scope of the present disclosure is not limited thereto.

The bus 1930 may provide a communication function between components of the computing device 1900. The bus 1930 may be implemented as various types of buses such as an address bus, a data bus, a control bus, etc.

The communication interface 1940 may support wired/wireless Internet communication of the computing device 1900. In addition, the communication interface 1940 may support various other communication methods in addition to the Internet communication. To this end, the communication interface 1940 may be configured to include a communication module well known in the technical field of the present disclosure.

The storage module 1950 may non-temporarily store one or more computer programs 1960. The storage module 1950 may be configured to include a nonvolatile memory such as a read only memory (ROM), an erasable programmable ROM (EPROM), an electrically erasable programmable ROM (EEPROM), a flash memory, etc., a hard disk, a detachable disk, or any type of computer-readable recording medium well known in the art to which the present disclosure pertains.

The computer program 1960 may include one or more instructions that, when loaded into the memory 1920, cause the processors 1910 to perform an operation/method in accordance with various embodiments of the present disclosure. That is, the processors 1910 may perform operations/methods according to various embodiments of the present disclosure by executing one or more instructions.

For example, the computer program 1960 may include instructions for receiving one or more first pathological slide images, and determining, from the received one or more first pathological slide images, a normal region based on the abnormality condition indicative of the condition of the abnormal region, and generate a first set of training data including the determined normal region, and generating the abnormal region by performing image processing corresponding to the abnormality condition with respect to the at least partial region in the received one or more first pathological slide images, and generating a second set of training data including the generated abnormal region. In another example, the computer program 1960 may include instructions for receiving one or more pathological slide images, and detecting the abnormal region meeting the abnormality condition in the received one or more pathological slide images by using a machine learning model. In another example, the computer program 1960 may include instructions for receiving one or more pathological slide images and detecting an ROI in the received one or more pathological slide images.

The above description of the present disclosure is provided to enable those skilled in the art to make or use the present disclosure. Various modifications of the present disclosure will be readily apparent to those skilled in the art, and the general principles defined herein may be applied to various modifications without departing from the spirit or scope of the present disclosure. Thus, the present disclosure is not intended to be limited to the examples described herein but is intended to be accorded the broadest scope consistent with the principles and novel features disclosed herein.

Although example implementations may refer to utilizing aspects of the presently disclosed subject matter in the context of one or more standalone computer systems, the subject matter is not so limited, and they may be implemented in conjunction with any computing environment, such as a network or distributed computing environment. Furthermore, aspects of the presently disclosed subject matter may be implemented in or across a plurality of processing chips or devices, and storage may be similarly influenced across a plurality of devices. Such devices may include PCs, network servers, and handheld devices.

Although the present disclosure has been described in connection with some embodiments herein, it should be understood that various modifications and changes can be made without departing from the scope of the present disclosure, which can be understood by those skilled in the art to which the present disclosure pertains. Further, such modifications and changes are intended to fall within the scope of the claims appended herein.

What is claimed is:

1. A method, performed by at least one processor, for training a machine learning model for detecting an abnormal region in a pathological slide image, comprising:
   receiving one or more first pathological slide images;
   determining, from the one or more first pathological slide images, a normal region based on an abnormality condition indicative of a condition of an abnormal region, wherein the condition is a criterion for determining whether a specific region included in the one or more first pathological slide images includes the abnormal region, the abnormal region includes image error information that is inappropriate for determining a lesion of a patient, and the image error information results from at least one of: an image quality problem, a slide quality problem, or an analysis target error;
   generating a first set of training data including the determined normal region;
   generating a training abnormal region by performing image processing corresponding to the abnormality condition with respect to at least partial region in the one or more first pathological slide images, wherein the generating the training abnormal region includes generating the training abnormal region by applying a blur kernel to the at least partial region in the one or more first pathological slide images; and
   generating a second set of training data including the training abnormal region.

2. The method of claim 1, further comprising training a machine learning model for detecting the abnormal region in the one or more first pathological slide images by using the generated first set of training data and the generated second set of training data.

3. The method of claim 2, wherein the machine learning model is further trained to output an abnormality score indicative of a degree of abnormality for one or more regions in a pathological slide image, and
   the method includes:
      receiving one or more second pathological slide images;
      inputting a plurality of regions included in the received one or more second pathological slide images to the trained machine learning model, to output abnormality scores for the plurality of regions;
      extracting at least a portion of the plurality of regions based on the output abnormality scores; and
      including the extracted at least the portion of the plurality of regions in the second set of training data.

4. The method of claim 1, wherein the abnormality condition includes a plurality of abnormality conditions, and
   the generating the training abnormal region includes:
      selecting one or more conditions from the plurality of abnormality conditions; and
      generating the training abnormal region by performing image processing corresponding to the one or more selected conditions with respect to the at least partial region in the received one or more first pathological slide images.

5. The method of claim 1, wherein the generating the training abnormal region includes generating the training abnormal region by applying a color transformation function to the at least partial region in the one or more first pathological slide images.

6. The method of claim 1, wherein the generating the training abnormal region includes generating the training abnormal region by applying at least one of a specific color or a specific brightness to the at least partial region in the one or more first pathological slide images.

7. The method of claim 1, wherein the generating the training abnormal region includes generating the training abnormal region by inserting a geometric figure into the at least partial region in the one or more first pathological slide images.

8. The method of claim 1, wherein the generating the training abnormal region includes:
   dividing the at least partial region of the one or more first pathological slide images into a first sub-region and a second sub-region; and
   generating the training abnormal region by overlaying a portion of the first sub-region on a portion of the second sub-region.

9. The method of claim 1, wherein the generating the training abnormal region includes:
   dividing the at least partial region of the one or more first pathological slide images into a plurality of sub-regions;
   generating images including a region having a change in at least one of a position, shape, size, or angle of each of the plurality of sub-regions; and
   generate the training abnormal region by combining the generated images.

10. A method, performed by at least one processor, for detecting an abnormal region in a pathological slide image, comprising:
    receiving a pathological slide image; and
    detecting, in the pathological slide image, an abnormal region meeting an abnormality condition by using a machine learning model, wherein the abnormality condition has a condition that is a criterion for determining whether a specific region includes the abnormal region, the abnormal region includes image error information that is inappropriate for determining a lesion of a patient, and the image error information results from at least one of: an image quality problem, a slide quality problem, or an analysis target error, wherein the machine learning model is trained to detect the abnormal region in the pathological slide image by:

receiving one or more first pathological slide images;

determining, from the one or more first pathological slide images, a normal region based on the abnormality condition;

generating a first set of training data including the determined normal region;

generating a training abnormal region by performing image processing corresponding to the abnormality condition with respect to at least partial region in the one or more first pathological slide images, wherein the generating the training abnormal region includes generating the training abnormal region by applying a blur kernel to the at least partial region in the one or more first pathological slide images; and generating a second set of training data including the training abnormal region.

11. The method of claim 10, further comprises outputting a score indicative of a degree of abnormality for one or more regions in the pathological slide image.

12. The method of claim 10, wherein the abnormal region includes at least one of a region with low resolution, a region with incorrect staining, a region containing a foreign substance, a region with a folded tissue, a region with a deformed or rotated position, or a region marked with a marker.

13. An information processing system comprising:

a memory storing one or more instructions; and a processor configured to execute the stored one or more instructions to receive one or more first pathological slide images;

determine, from the one or more first pathological slide images, a normal region based on an abnormality condition indicative of a condition of an abnormal region, wherein the condition is a criterion for determining whether a specific region included in the one or more first pathological slide images includes the abnormal region, the abnormal region includes image error information that is inappropriate for determining a lesion of a patient, and the image error information results from at least one of: an image quality problem, a slide quality problem, or an analysis target error;

generate a first set of training data including the determined normal region;

generate a training abnormal region by performing image processing corresponding to the abnormality condition with respect to at least partial region in the one or more first pathological slide images, wherein the generating the training abnormal region includes generating the training abnormal region by applying a blur kernel to the at least partial region in the one or more first pathological slide images; and generate a second set of training data including the training abnormal region.

14. The information processing system of claim 13, wherein the processor is further configured to train a machine learning model for detecting the abnormal region in the one or more first pathological slide images by using the generated first set of training data and the generated second set of training data.

15. The information processing system of claim 14, wherein the machine learning model is further trained to output an abnormality score indicative of a degree of abnormality for one or more regions in a pathological slide image, and the processor is further configured to receive one or more second pathological slide images, input a plurality of regions included in the received one or more second pathological slide images to the trained machine learning model, to output abnormality scores for the plurality of regions, extract at least a portion of the plurality of regions based on the output abnormality scores, and include the extracted at least the portion of the plurality of regions in the second set of training data.

16. The information processing system of claim 13, wherein the abnormality condition includes a plurality of abnormality conditions, and the processor is further configured to select one or more conditions from the plurality of abnormality conditions, and generate the training abnormal region by performing image processing corresponding to the one or more selected conditions with respect to the at least partial region in the received one or more first pathological slide images.

17. The information processing system of claim 13, wherein the processor is further configured to generate the training abnormal region by applying a color transformation function to the at least partial region in the one or more first pathological slide images.

18. The information processing system of claim 13, wherein the processor is further configured to divide the at least partial region of the one or more first pathological slide images into a first sub-region and a second sub-region, and generate the training abnormal region by overlaying a portion of the first sub-region on a portion of the second sub-region.

* * * * *